(12) United States Patent
Shinohara

(10) Patent No.: US 8,514,498 B2
(45) Date of Patent: Aug. 20, 2013

(54) ZOOM LENS AND OPTICAL APPARATUS HAVING THE ZOOM LENS

(75) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/086,204

(22) Filed: Apr. 13, 2011

(65) Prior Publication Data

US 2011/0255176 A1  Oct. 20, 2011

(30) Foreign Application Priority Data

Apr. 19, 2010 (JP) ................................. 2010-095809

(51) Int. Cl.
*G02B 15/14* (2006.01)
(52) U.S. Cl.
USPC ............................................ 359/694; 359/686
(58) Field of Classification Search
USPC ................................................. 359/694, 686
See application file for complete search history.

(56) References Cited

U.S. PATENT DOCUMENTS

2010/0321792 A1* 12/2010 Yamagami ..................... 359/687

FOREIGN PATENT DOCUMENTS

JP 11-305129 A 11/1999
JP 2006-171431 A 6/2006

* cited by examiner

*Primary Examiner* — James Jones
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, a third lens unit having a positive refractive power, and a fourth lens unit having a positive refractive power. The second lens unit and the fourth lens unit move during zooming. The third lens unit includes at least one positive lens and at least one negative lens. When Rnf and Rnr are radiuses of curvature of surfaces on the object side and the image side respectively of one negative lens of the second lens unit, Rpf and Rpr are radiuses of curvature on the object side and the image side respectively of one positive lens of the second lens unit, the following conditions are satisfied:

$3.4 < (Rnf - Rnr)/(Rnf + Rnr) < 4.4$ $-0.7 < (Rpf - Rpr)/(Rpf + Rpr) < -0.5.$

8 Claims, 21 Drawing Sheets

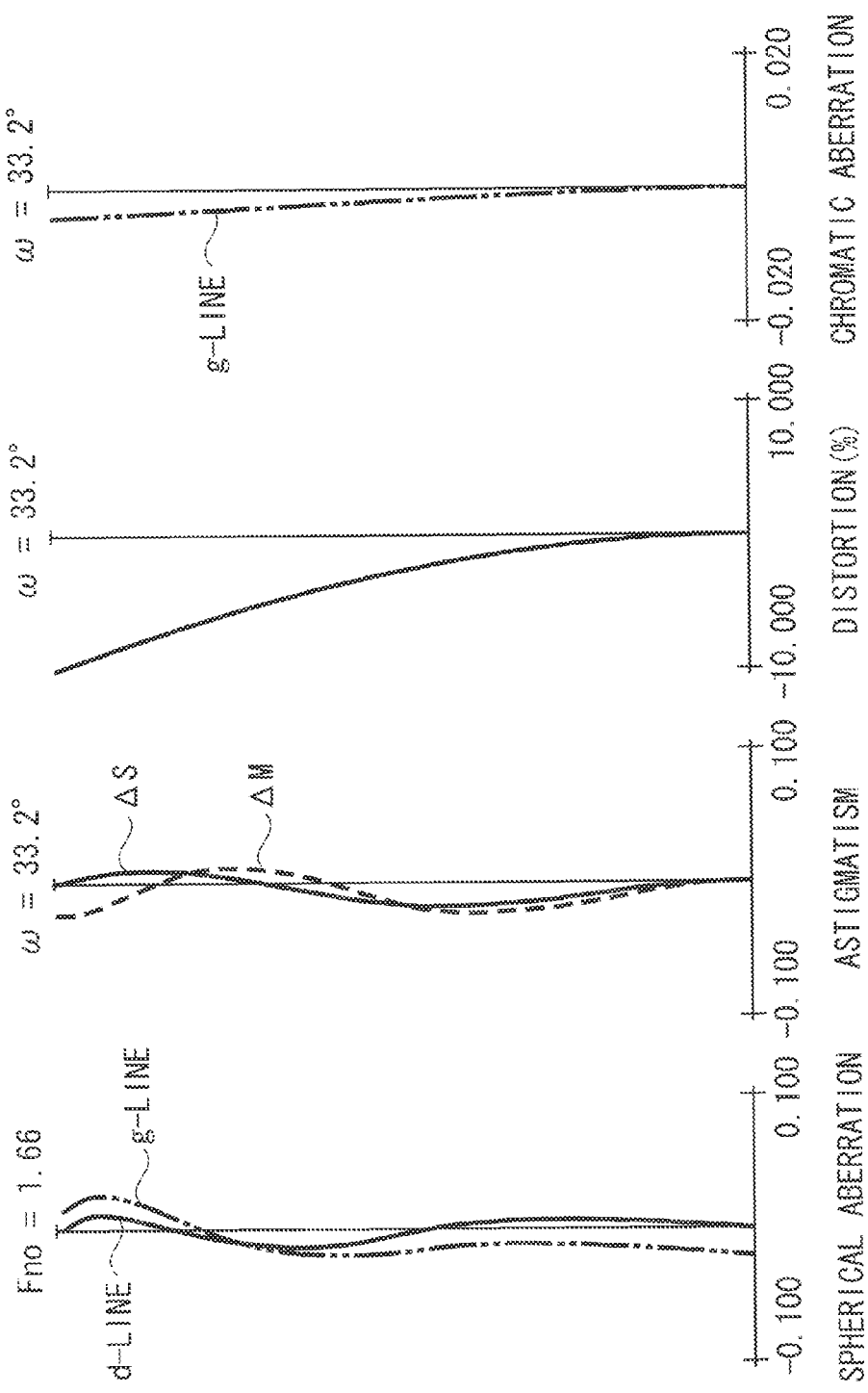

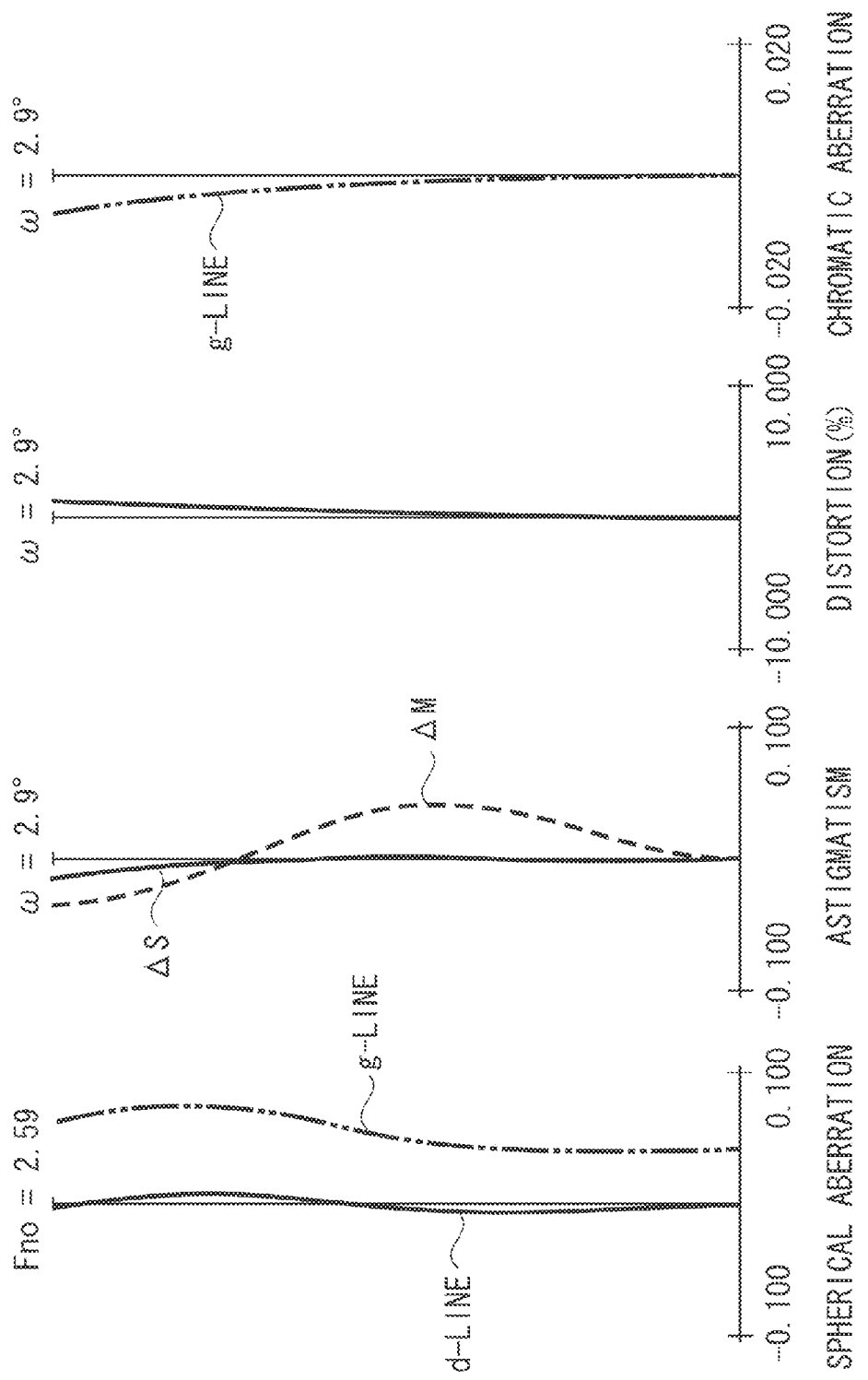

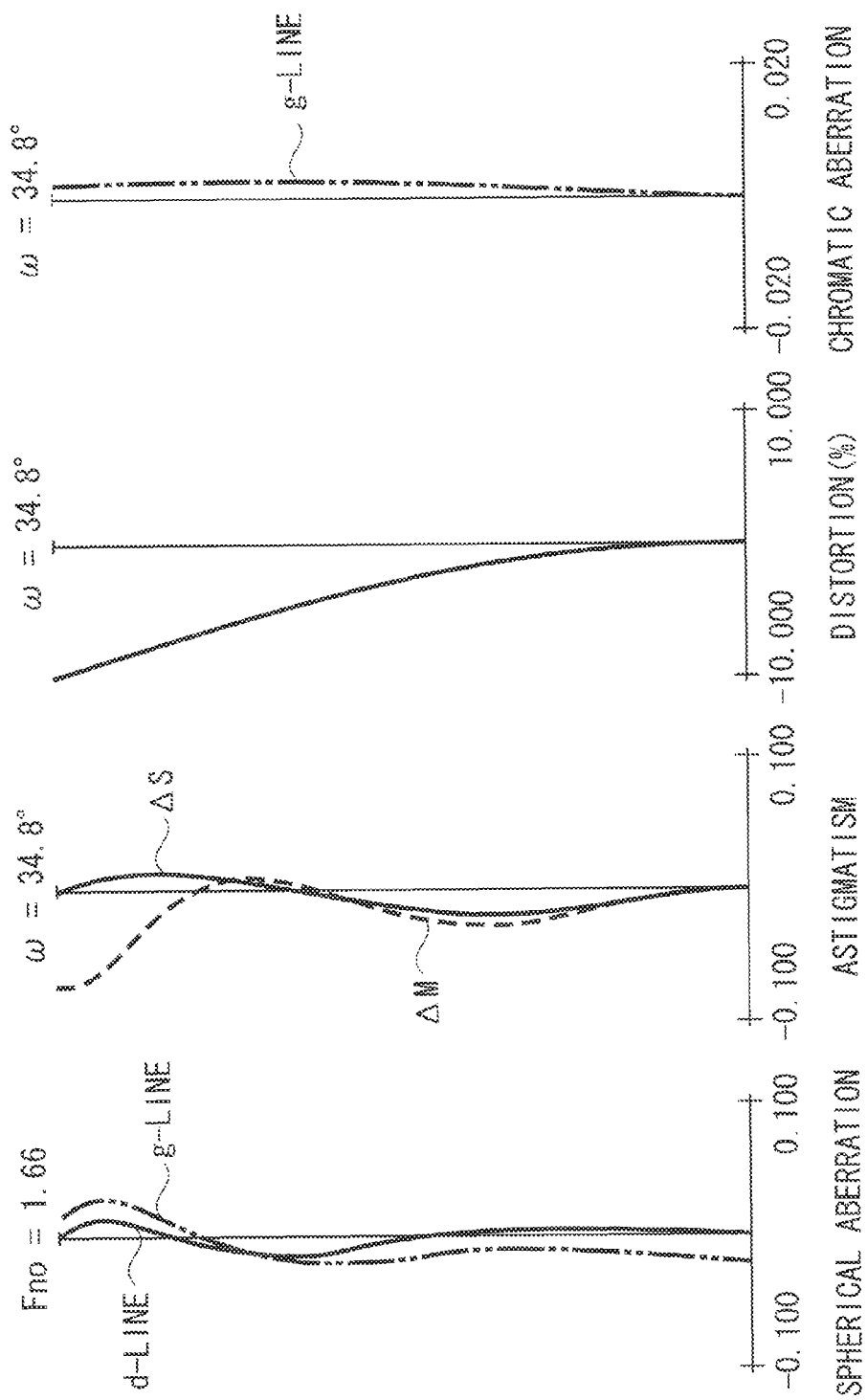

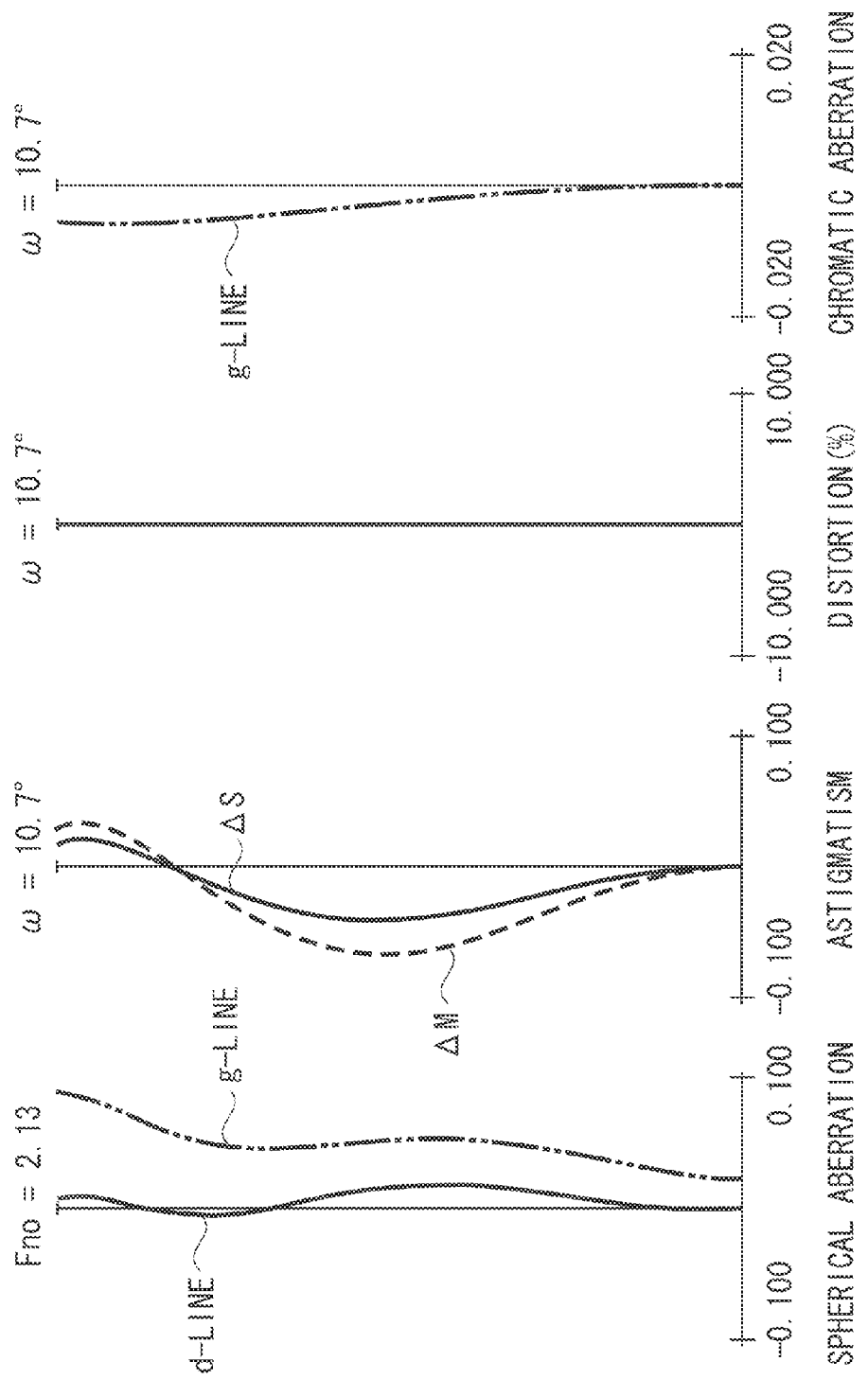

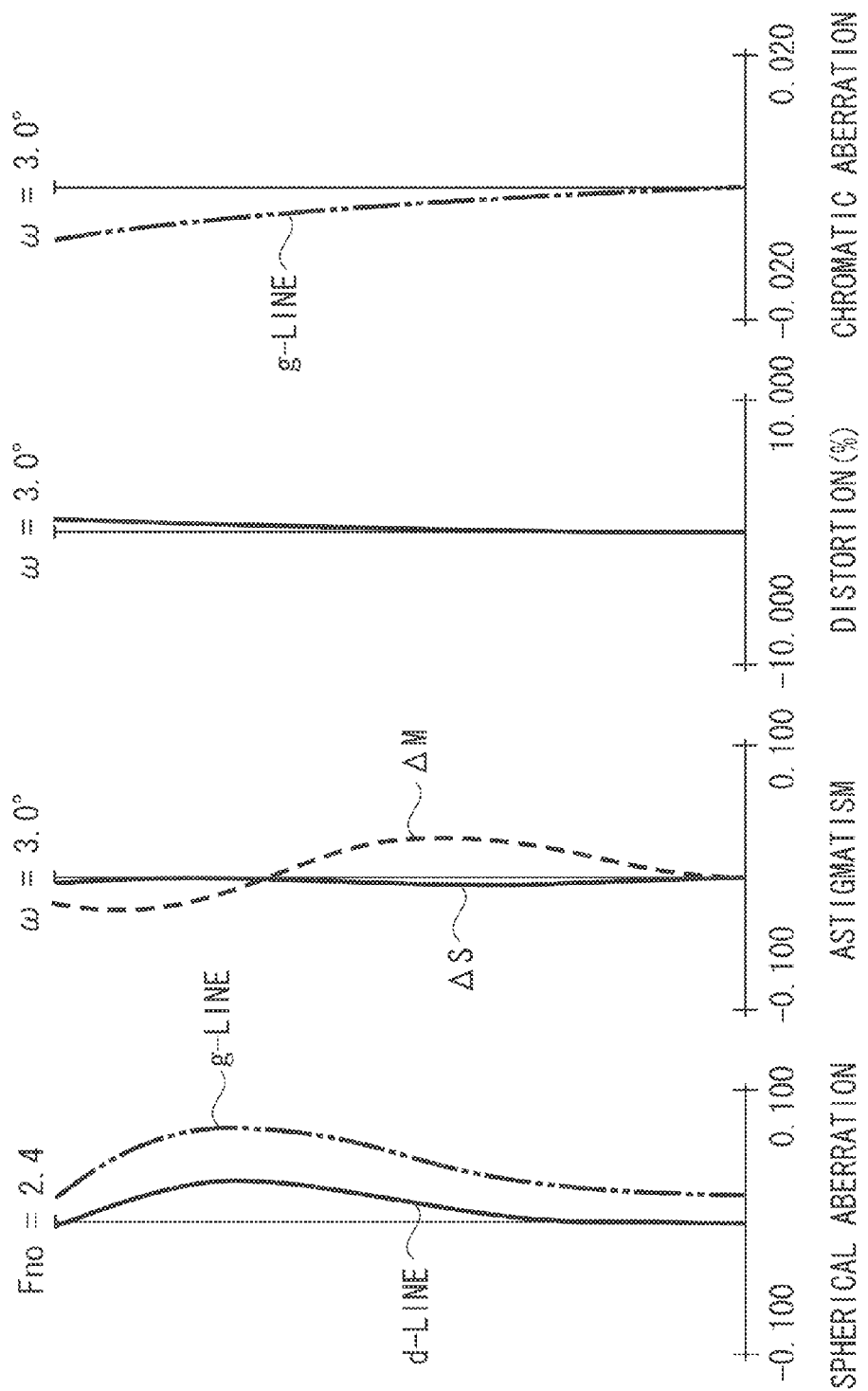

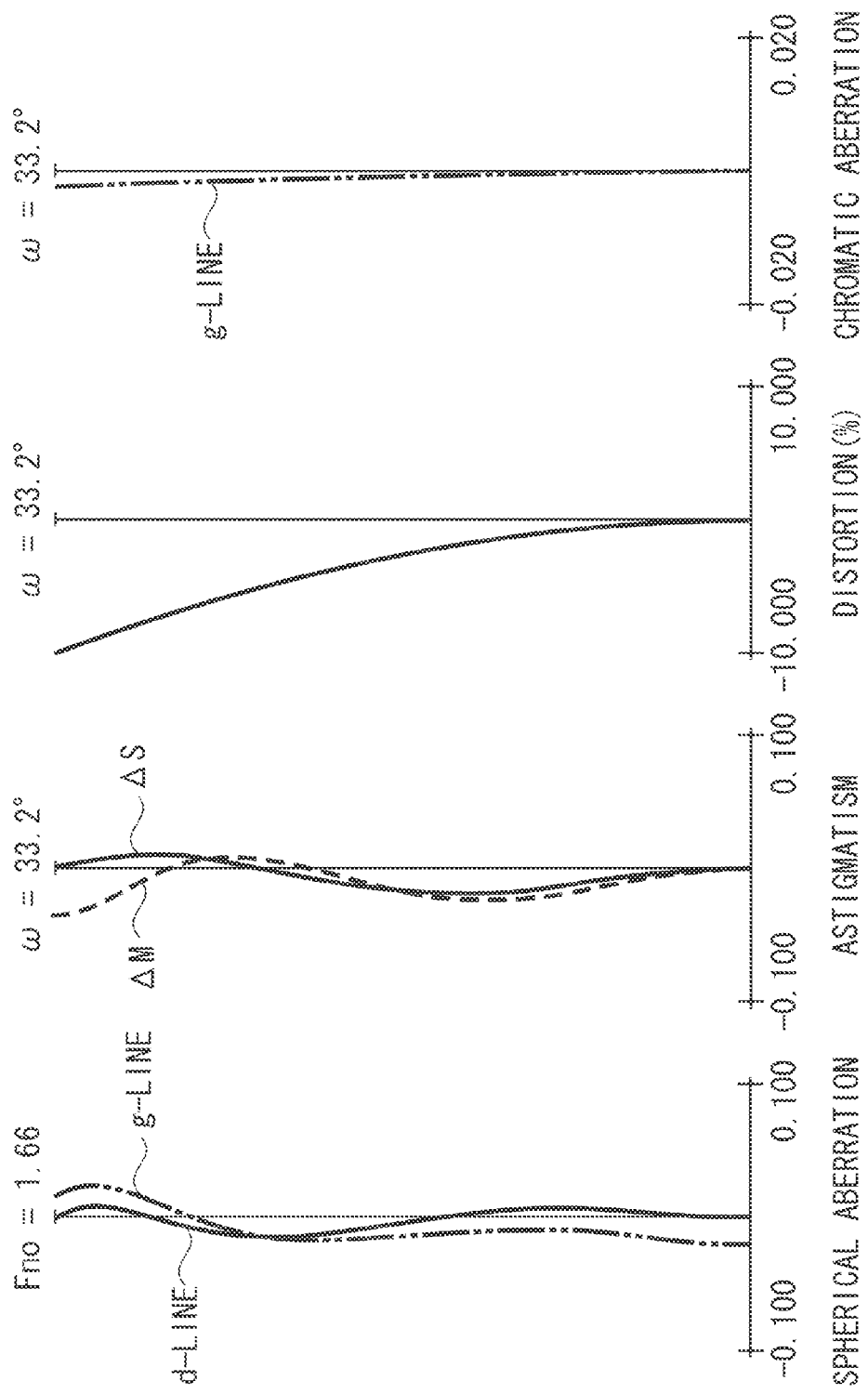

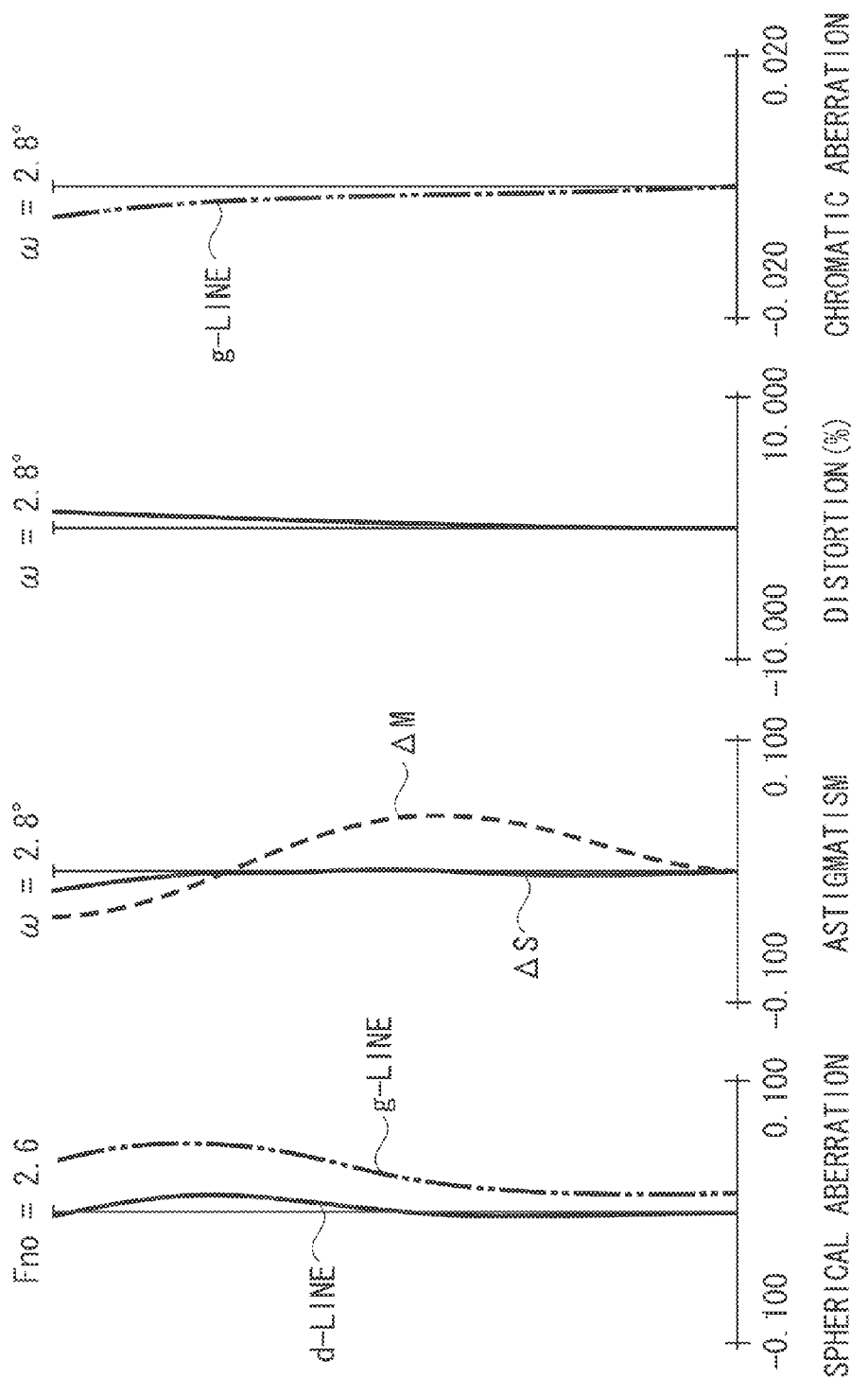

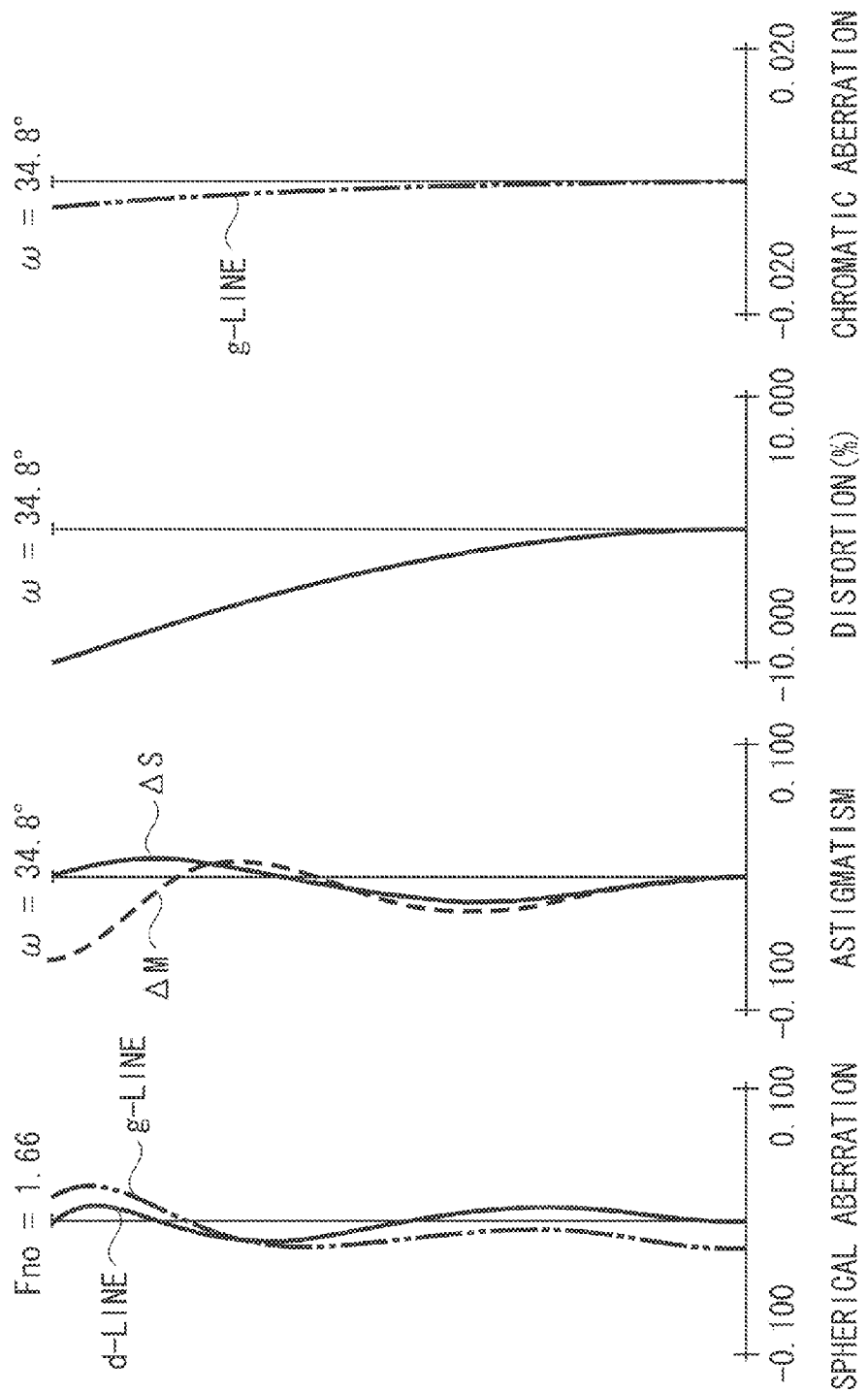

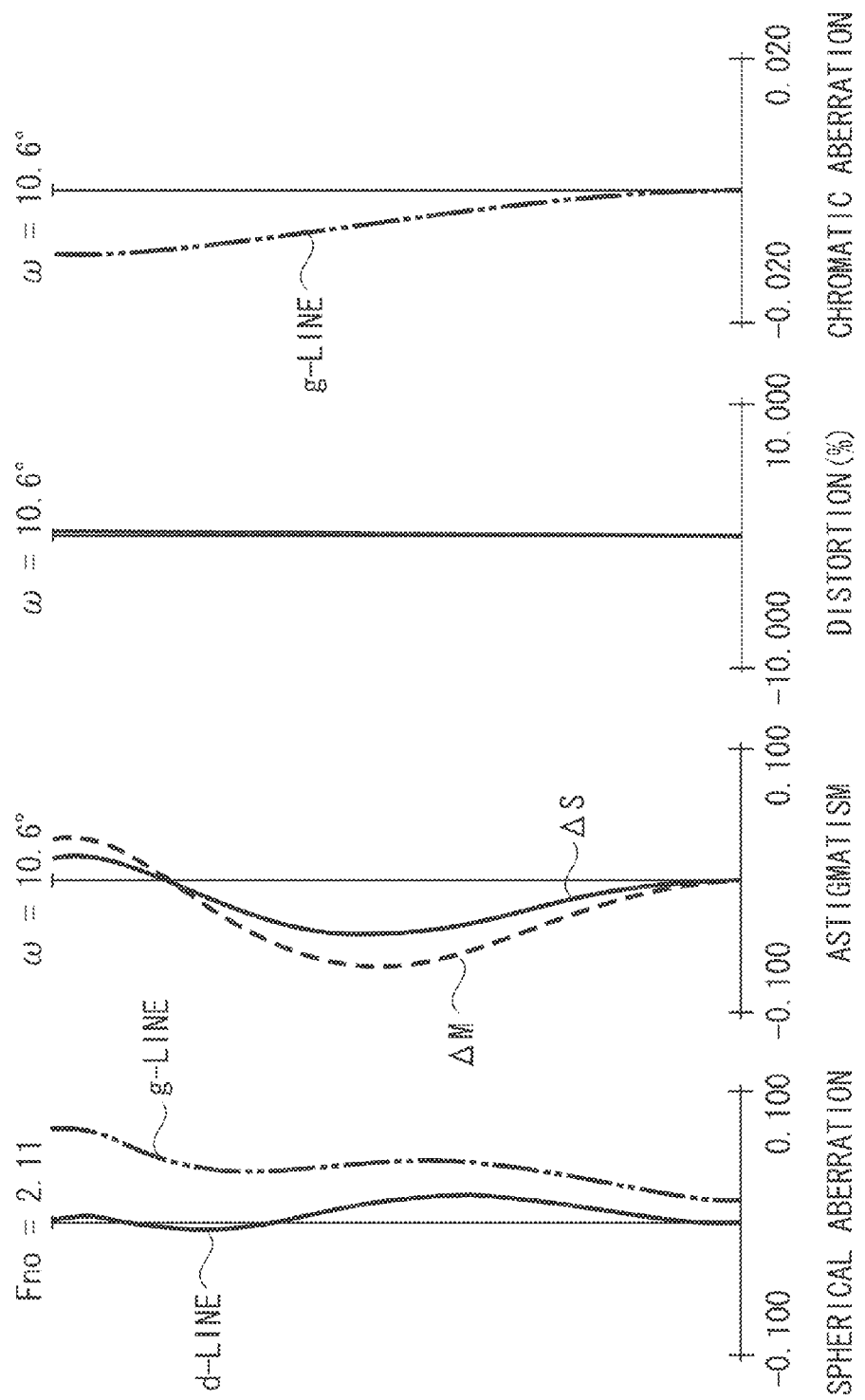

ZOOM LENS AND OPTICAL APPARATUS HAVING THE ZOOM LENS

BACKGROUND OF THE INVENTION

1. Field of the Invention

The present invention relates to a zoom lens and an image pickup apparatus on which the zoom lens can be used. More specifically, the present invention relates to a zoom lens useful as a photographic lens used in an image pickup apparatus, such as a digital still camera, a video camera, a surveillance camera, a television (TV) camera, and a film camera, and an optical apparatus having the zoom lens.

2. Description of the Related Art

Current market forces demand image pickup apparatuses with reduced size and increased functionality. To that end, newly designed photographic optical systems used in an optical apparatus, such as a video camera, a surveillance camera, or a digital still camera, are desired to be small and highly versatile. In particular, a small-sized zoom lens having a wide angle of view, a high zoom ratio, and a high optical performance for the entire zooming range is highly desirable.

A conventional four-unit zoom lens, which includes, in order from the object side to the image side, a first lens unit having a positive refractive power, a second lens unit having a negative refractive power, a third lens unit having a positive refractive power and a fourth lens unit having a positive refractive power, has already been proposed. Examples of the conventional four-unit zoom lens are described in Japanese Patent Application Laid-Open No. 11-305129 and Japanese Patent Application Laid-Open No. 2006-171431. Both of these patent applications discuss a rear-focus type four-unit zoom lens that executes variable magnification by moving the second lens unit and corrects the variation on the image plane that may occur during variable magnification and executes focusing by using the fourth lens unit.

A rear-focus type zoom lens is more useful than a zoom lens that executes focusing by moving the first lens unit due to the following characteristics. In a rear-focus type zoom lens, the effective diameter of the first lens unit is smaller than the diameter in the zoom lens that executes focusing by moving the first lens unit. Accordingly, it becomes easier to reduce the total size of the lens system. In addition, in the rear-focus type zoom lens like this, a small-size lens unit is moved to execute variable magnification and focusing. Accordingly, a smaller driving force is required to drive the lens unit. Therefore, quicker focusing can be achieved if a rear-focus type zoom lens is used.

However, if the rear-focus type zoom lens described above is used, variation of aberration that occurs during focusing may increase. Therefore, it may become difficult to achieve a high optical performance for the entire area of focusing (i.e., the object distance) from an infinitely-distant object to a short-distance object.

In order to achieve a wide angle of view on a small-size rear-focus type four-unit zoom lens, it is significant to appropriately arrange and set the lens configuration of the magnification-varying second lens unit having a negative refractive power and the third lens unit having a positive refractive power. Unless the shape of each lens that constitutes the second lens unit or the lens configuration of the third lens unit is appropriately set, it may become difficult to achieve an optical system (zoom lens) whose total size is small and having a predetermined high zoom ratio. Accordingly, in this case, variation of various aberrations that may occur during zooming may increase. Therefore, it becomes difficult to achieve a high optical performance.

SUMMARY OF THE INVENTION

According to an aspect of the present invention, a zoom lens includes, in order from an object side to an image side, a first lens unit having a positive refractive power, a second lens unit having a negative refractive power, a third lens unit having a positive refractive power, and a fourth lens unit having a positive refractive power. The second lens unit and the fourth lens unit move during zooming. The third lens unit includes at least one positive lens and at least one negative lens. When Rnf and Rnr are radiuses of curvature of surfaces on the object side and the image side respectively of one negative lens of the second lens unit, and Rpf and Rpr are radiuses of curvature of surfaces on the object side and the image side respectively of one positive lens of the second lens unit, the following conditions are satisfied:

$$3.4 < (Rnf - Rnr)/(Rnf + Rnr) < 4.4$$

$$-0.7 < (Rpf - Rpr)/(Rpf + Rpr) < -0.5.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B, and 2C are aberration charts of the zoom lens according to the first exemplary embodiment at the wide-angle end, at the middle focal length, and at the telephoto end, respectively.

FIGS. 4A, 4B, and 4C are aberration charts of the zoom lens according to the second exemplary embodiment at the wide-angle end, at the middle focal length, and at the telephoto end, respectively.

FIGS. 6A, 6B, and 6C are aberration charts of the zoom lens according to the third exemplary embodiment at the wide-angle end, at the middle focal length, and at the telephoto end, respectively.

FIGS. 8A, 8B, and 8C are aberration charts of the zoom lens according to the fourth exemplary embodiment at the wide-angle end, at the middle focal length, and at the telephoto end, respectively.

DESCRIPTION OF THE EMBODIMENTS

Figure 1:
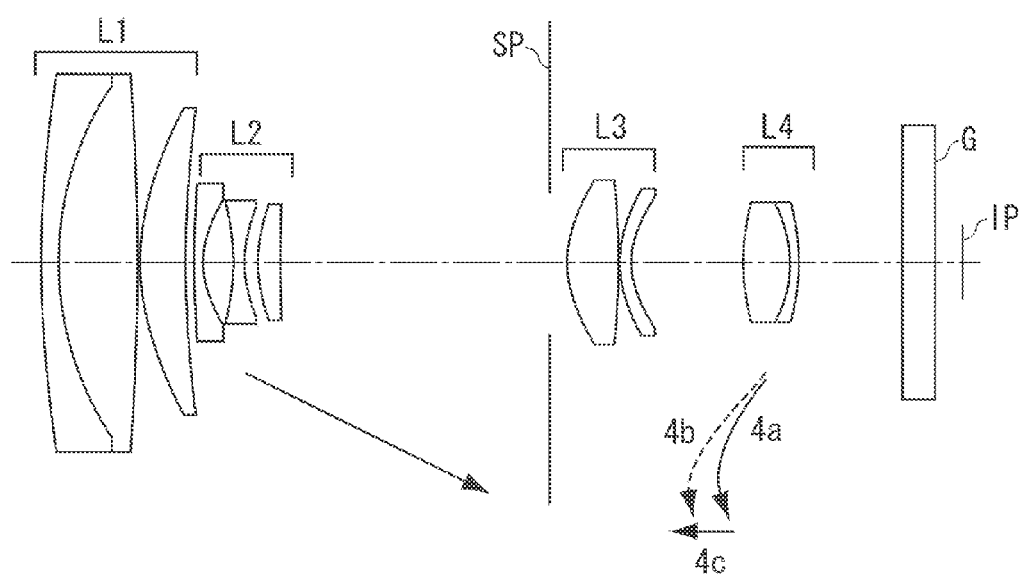
FIG. 1 is a lens cross section of a zoom lens according to a first exemplary embodiment of the present invention at the wide-angle end.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

A zoom lens according to an exemplary embodiment of the present invention includes, in order from the object side to the image side, a first lens unit having a positive refractive power, a second lens unit having a negative refractive power, a third lens unit having a positive refractive power, and a fourth lens unit having a positive refractive power. During zooming, the second lens unit and the fourth lens unit move. The fourth lens unit moves to execute focusing. On at least one object side of the first lens unit or the image side of the fourth lens unit, a lens unit having a refractive power, such as a converter lens, may be provided.

Figure 2B:
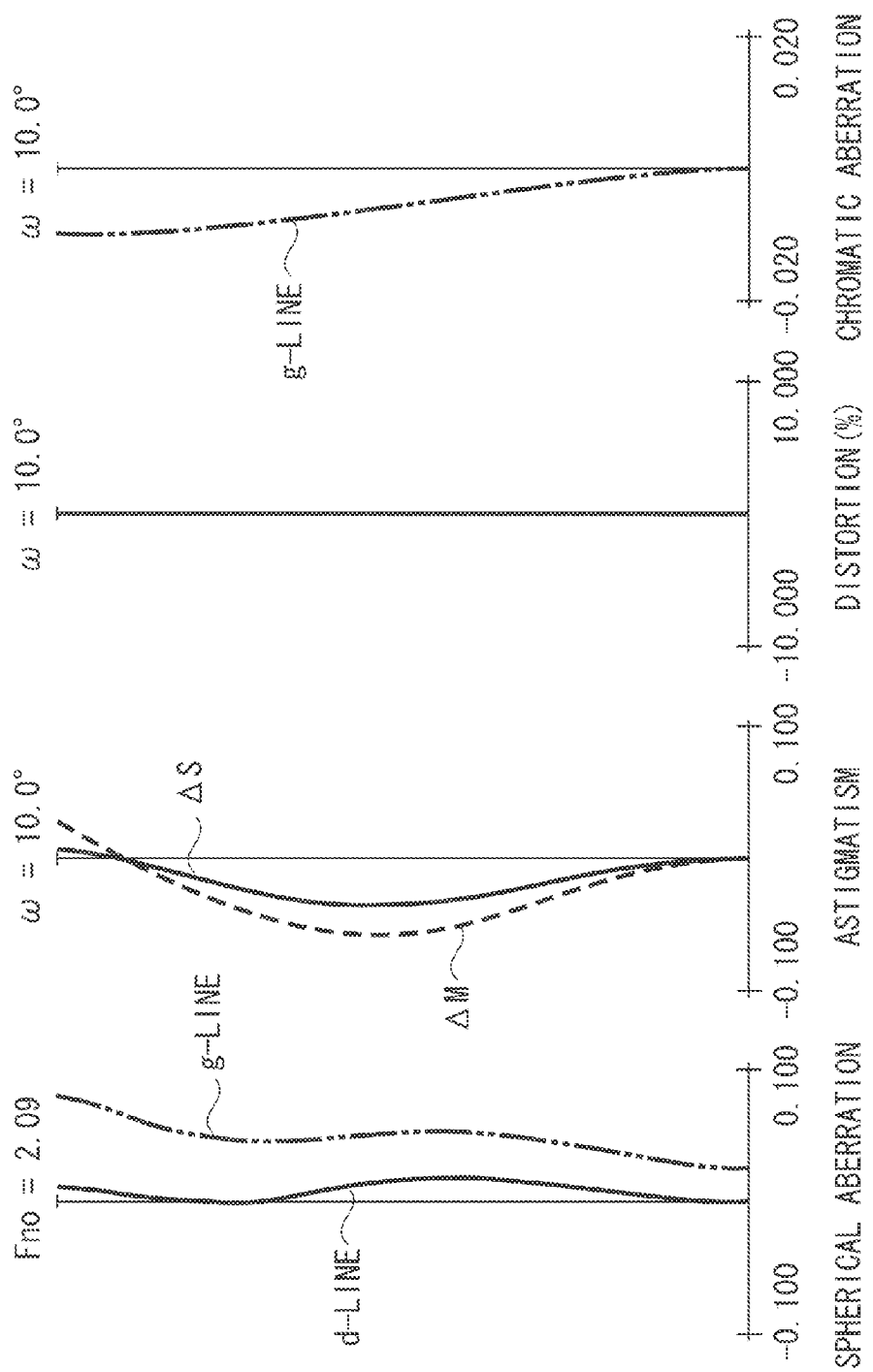

FIG. 1 is a lens cross section of a zoom lens according to a first exemplary embodiment of the present invention at the wide-angle end (short focal length end). FIGS. 2A, 2B, and 2C are aberration charts of the zoom lens according to the first exemplary embodiment at the wide-angle end, at the middle focal length, and at the telephoto end (long focal length end), respectively.

Figure 3:
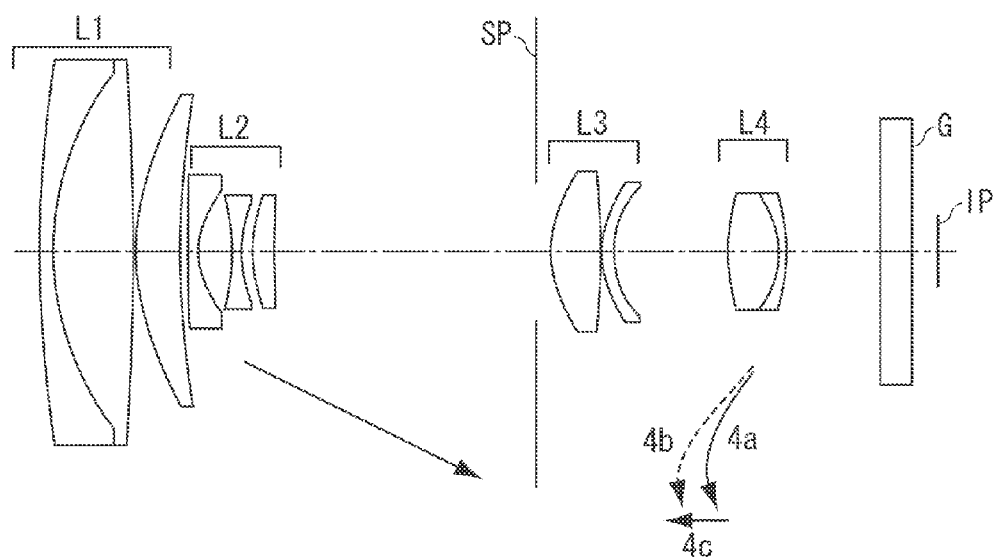
FIG. 3 is a lens cross section of a zoom lens according to a second exemplary embodiment of the present invention at the wide-angle end.

FIG. 3 is a lens cross section of a zoom lens according to a second exemplary embodiment of the present invention at the wide-angle end. FIGS. 4A, 4B, and 4C are aberration charts of the zoom lens according to the second exemplary embodiment at the wide-angle end, at the middle focal length, and at the telephoto end, respectively.

Figure 5:
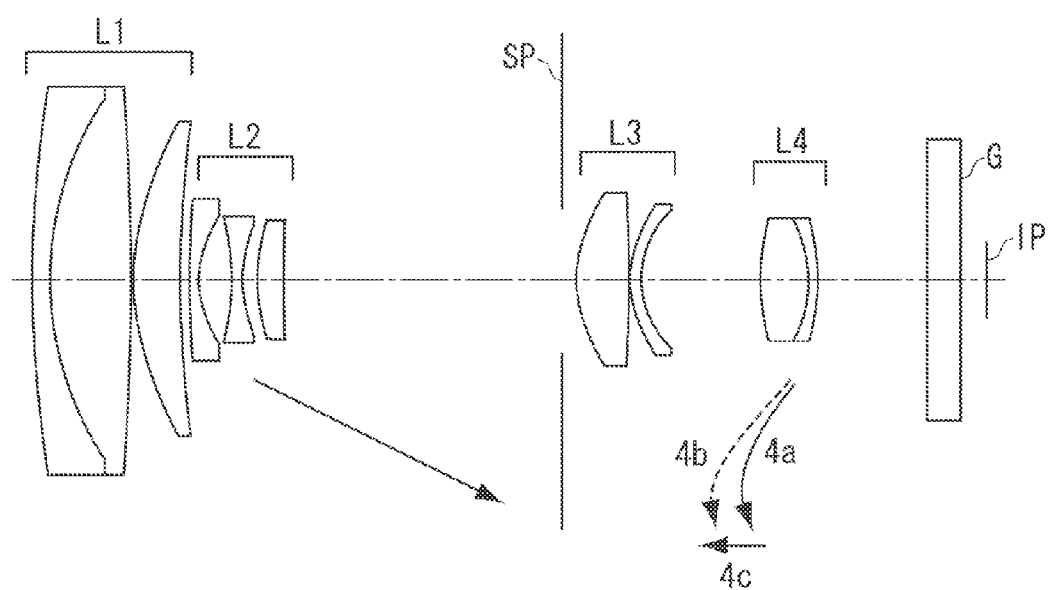
FIG. 5 is a lens cross section of a zoom lens according to a third exemplary embodiment of the present invention at the wide-angle end.
Figure 6B:
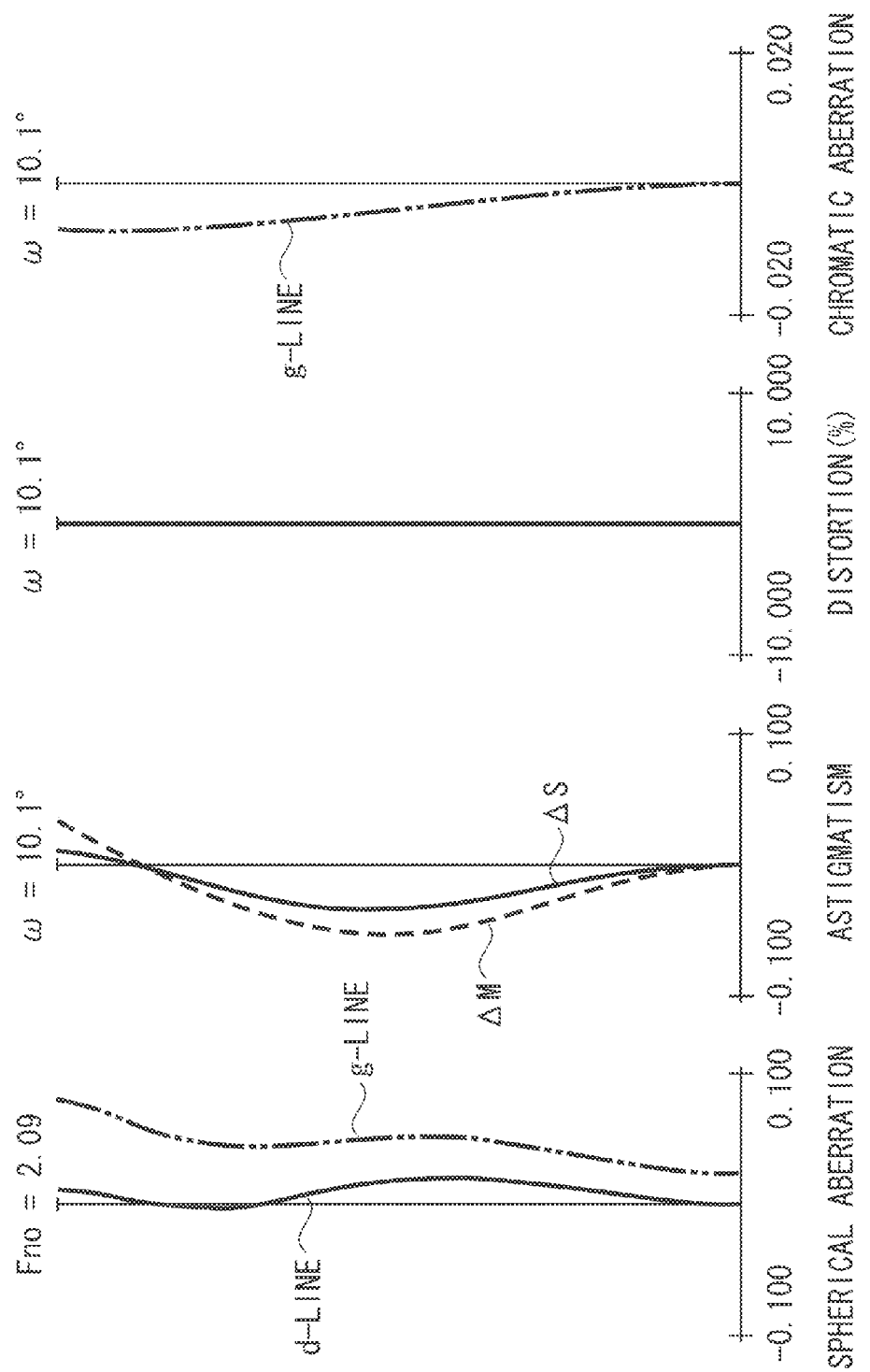

FIG. 5 is a lens cross section of a zoom lens according to a third exemplary embodiment of the present invention at the wide-angle end. FIGS. 6A, 6B, and 6C are aberration charts of the zoom lens according to the third exemplary embodiment at the wide-angle end, at the middle focal length, and at the telephoto end, respectively.

Figure 7:
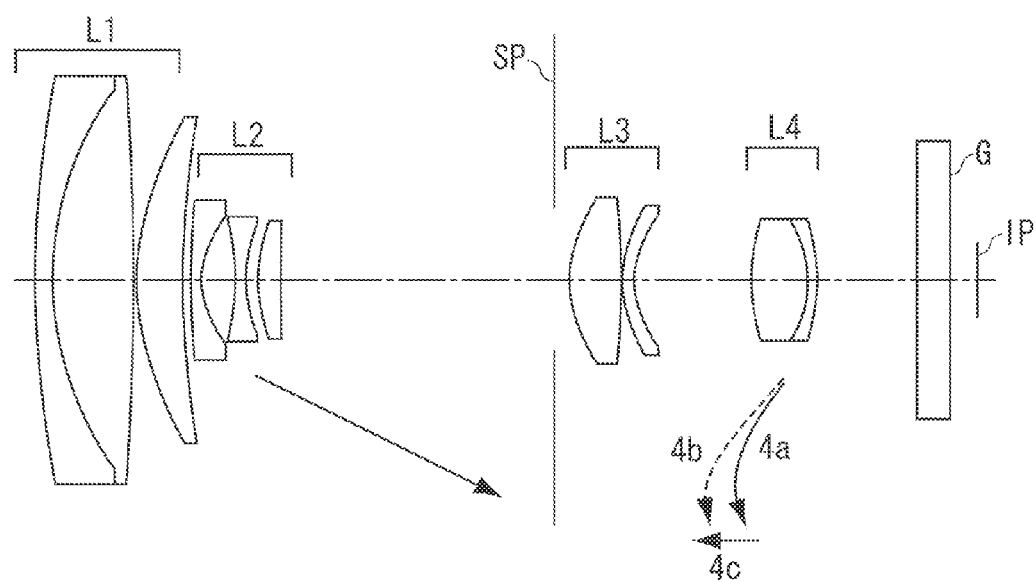
FIG. 7 is a lens cross section of a zoom lens according to a fourth exemplary embodiment of the present invention at the wide-angle end.
Figure 8C:
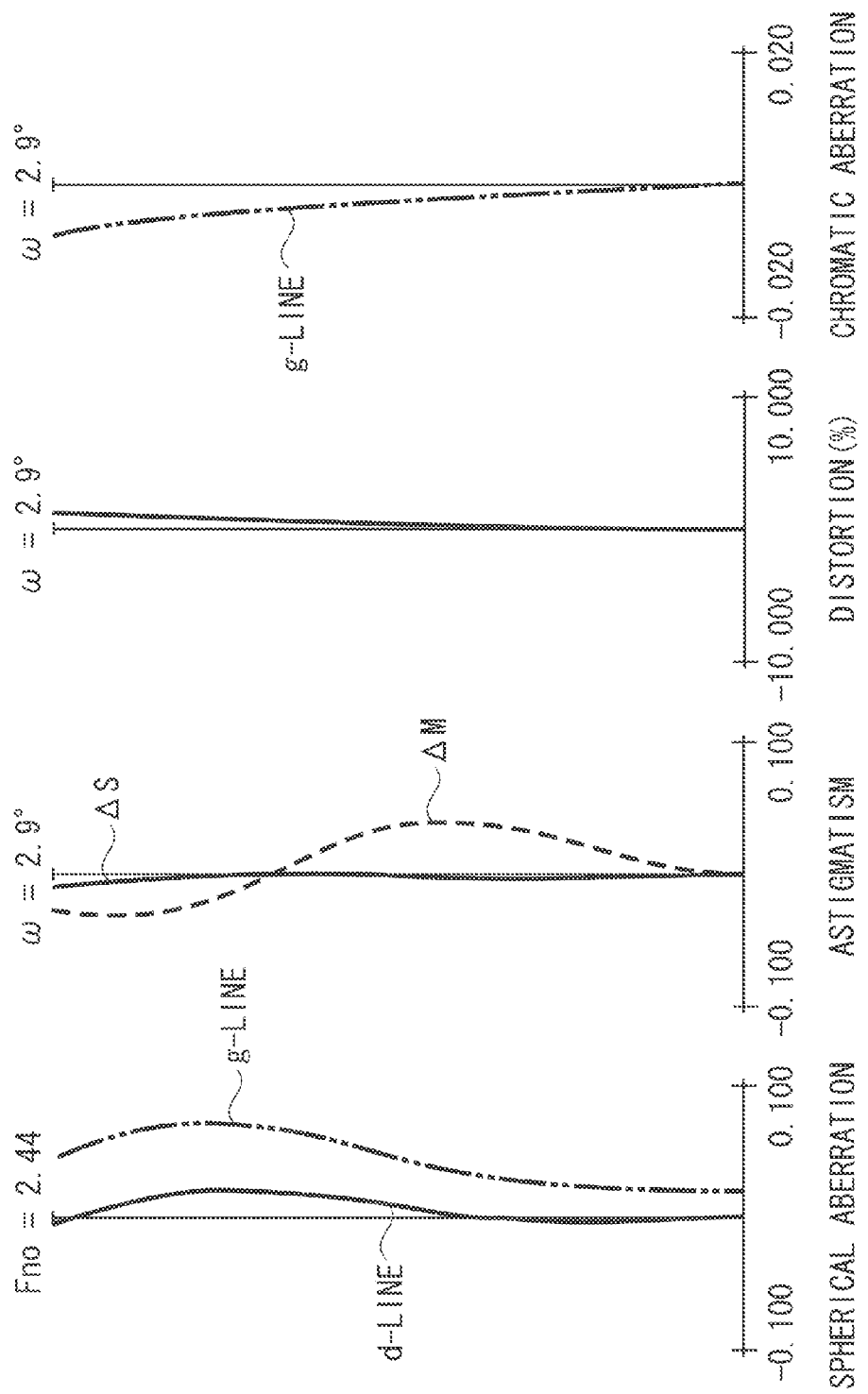

FIG. 7 is a lens cross section of a zoom lens according to a fourth exemplary embodiment of the present invention at the wide-angle end. FIGS. 8A, 8B, and 8C are aberration charts of the zoom lens according to the fourth exemplary embodiment at the wide-angle end, at the middle focal length, and at the telephoto end, respectively.

Figure 9:
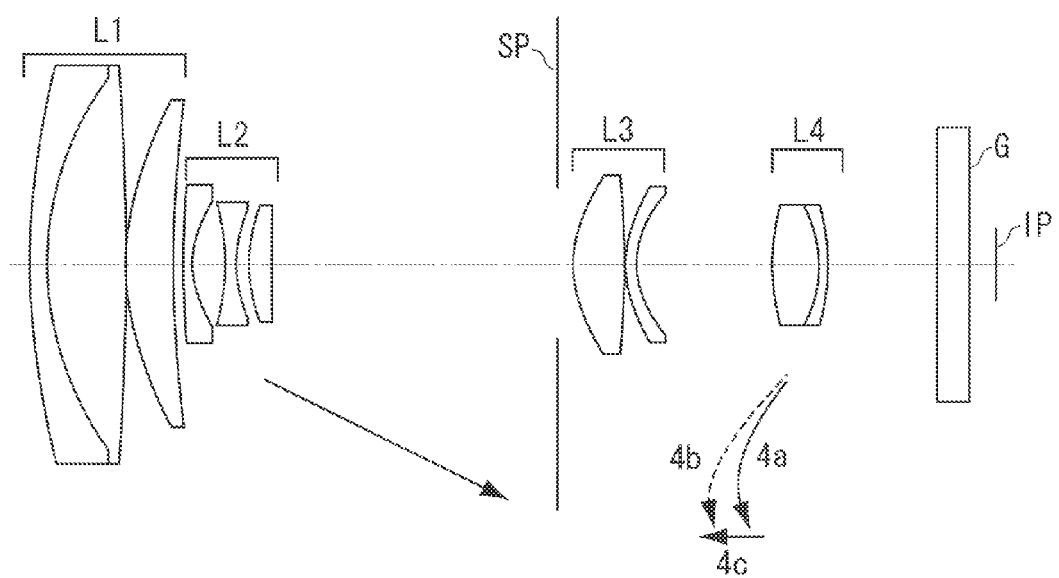
FIG. 9 is a lens cross section of a zoom lens according to a fifth exemplary embodiment of the present invention at the wide-angle end.
Figure 10A:
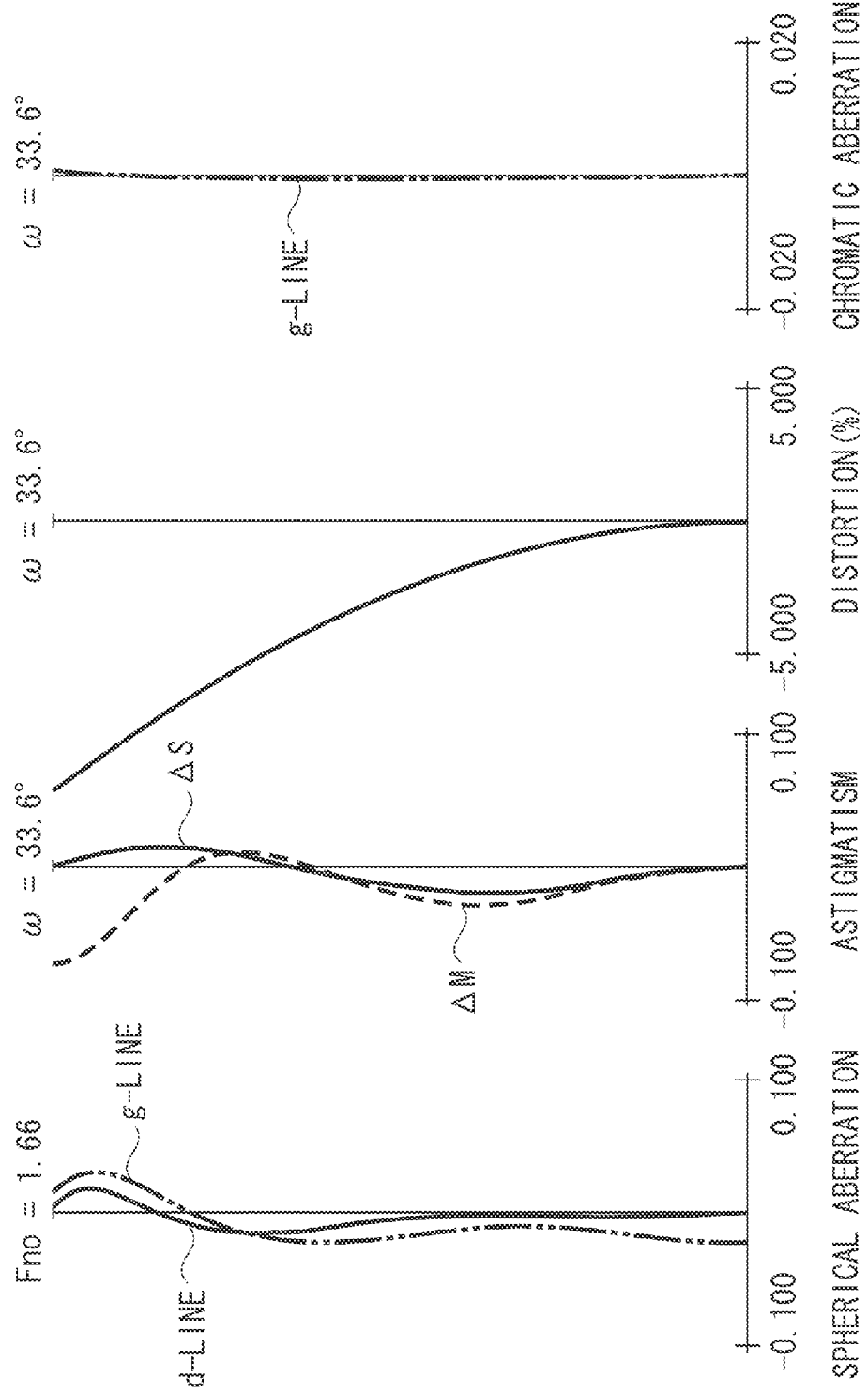
FIGS. 10A, 10B, and 10C are aberration charts of the zoom lens according to the fifth exemplary embodiment at the wide-angle end, at the middle focal length, and at the telephoto end, respectively.
Figure 10B:
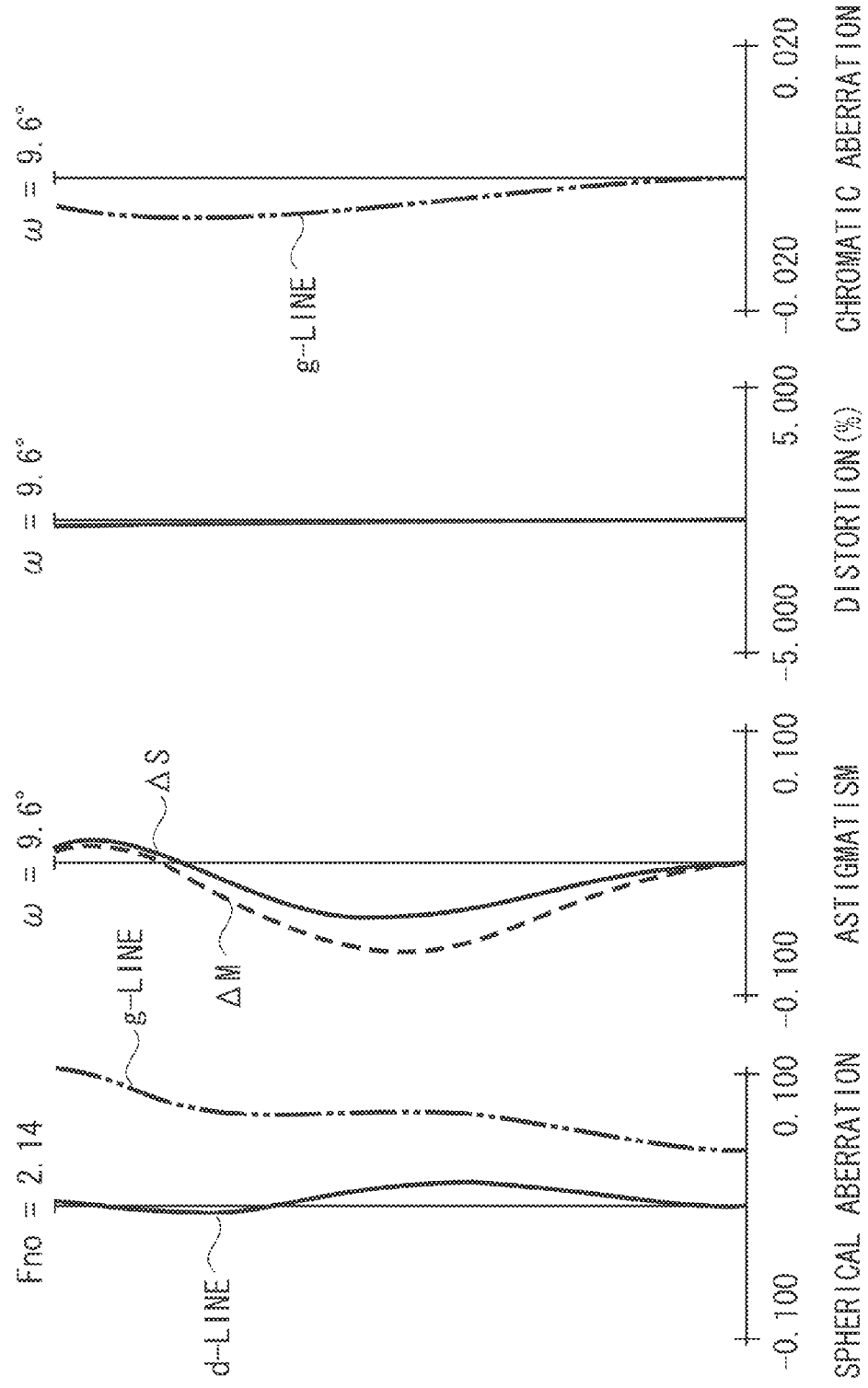
Figure 10C:
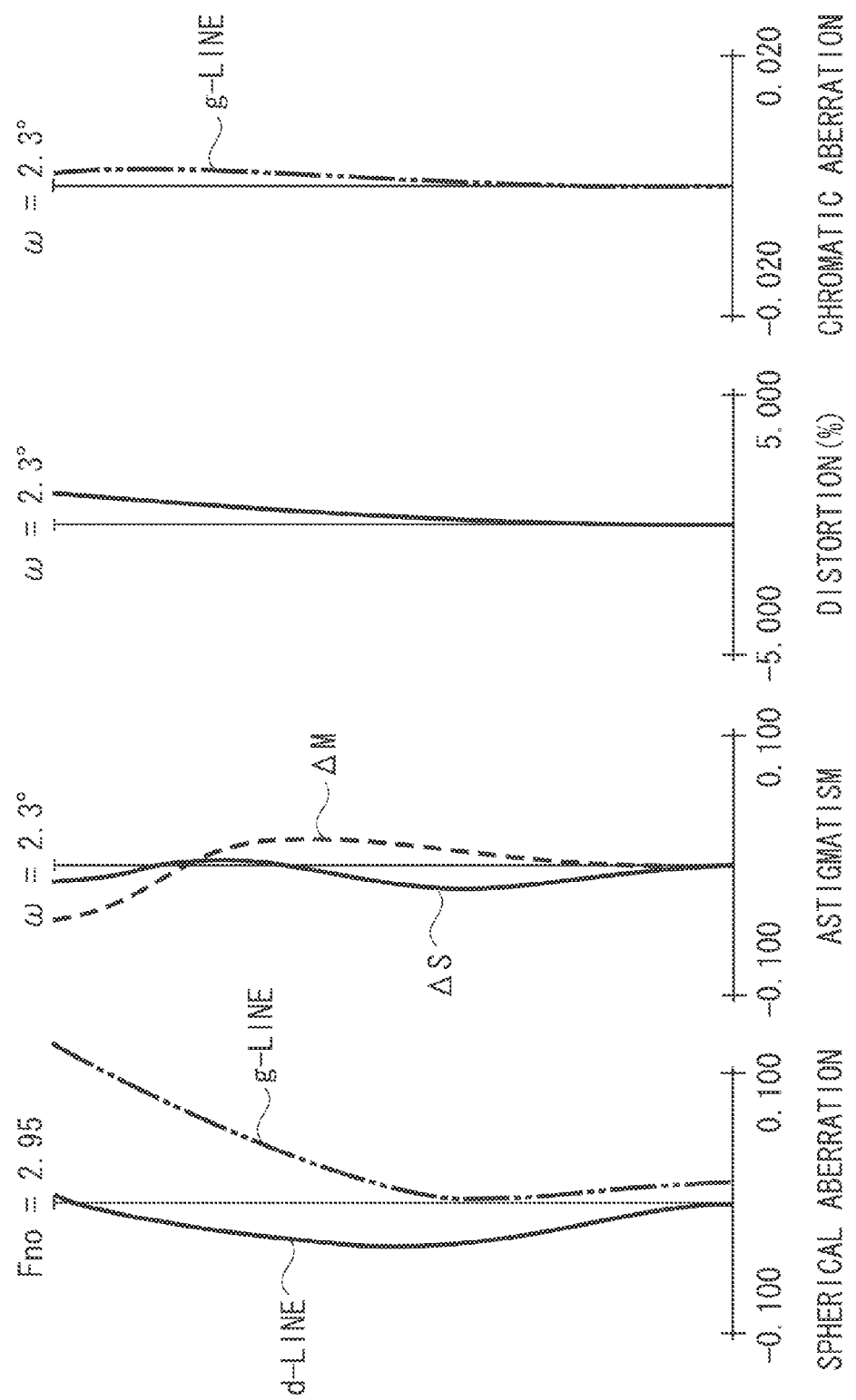
Figure 11:
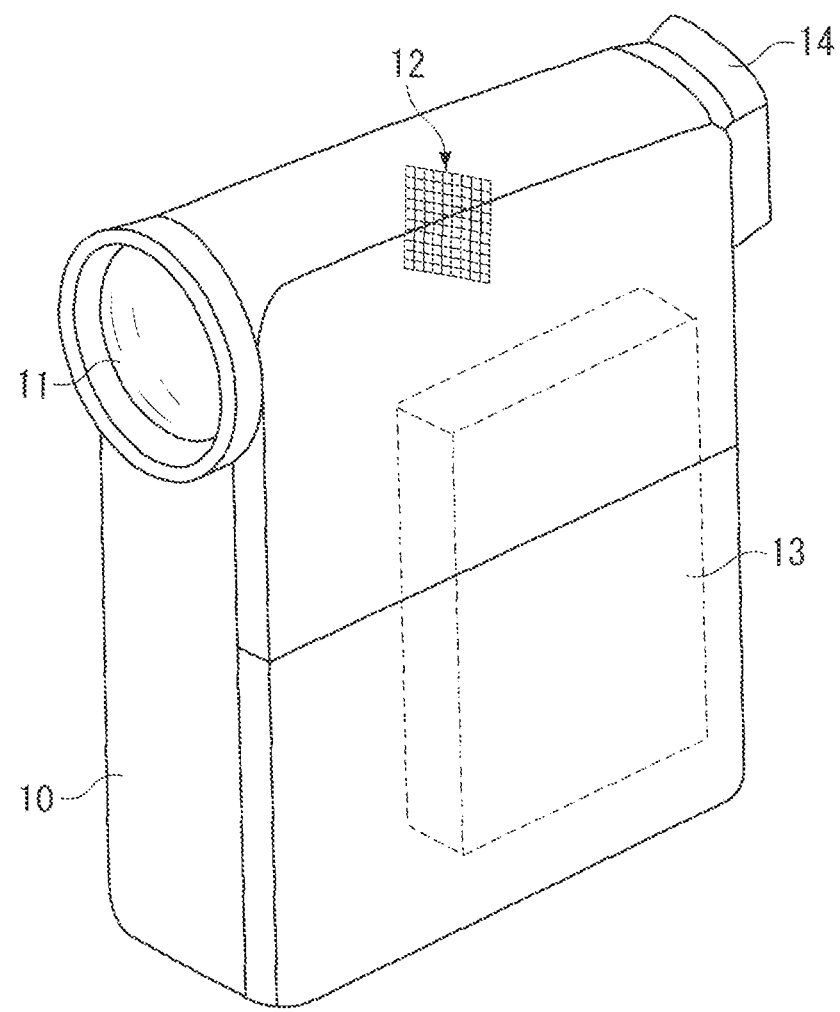
FIG. 11 illustrates main components of a video camera according to an exemplary embodiment of the present invention when the zoom lens is applied as an optical system of the video camera.

FIG. 9 is a lens cross section of a zoom lens according to a fifth exemplary embodiment of the present invention at the wide-angle end. FIGS. 10A, 10B, and 10C are aberration charts of the zoom lens according to the fifth exemplary embodiment at the wide-angle end, at the middle focal length, and at the telephoto end, respectively. FIG. 11 illustrates main components of a video camera (image pickup apparatus (optical apparatus)) including a zoom lens according to an exemplary embodiment of the present invention. The zoom lens according to each exemplary embodiment is a photographic lens system used on an optical apparatus, such as a video camera or a digital camera.

In each of the diagrams showing a cross section of the zoom lens (FIGS. 1, 3, 5, 7, and 9), an object side (front side) is shown at the left-hand portion of the drawing, and an image side (rear side) is shown at the right-hand portion thereof. If the zoom lens according to each exemplary embodiment of the present invention is used as a projection lens for a projector, in each of the diagrams showing a cross section of the zoom lens (FIGS. 1, 3, 5, 7, and 9), the side of a screen is shown at the left-hand portion of the drawing, and the side of an image to be projected is shown at the right-hand portion thereof.

Furthermore, in each of the diagrams showing a cross section of the zoom lens (FIGS. 1, 3, 5, 7, and 9), "i" (where i=1, 2, 3 . . . ) denotes an order of a lens unit from the object side to the image side. "Li" denotes an i-th lens unit. In addition, in each of the lens cross sections of the zoom lens according to the first through the fifth exemplary embodiments (FIGS. 1, 3, 5, 7, and 9), "L1" denotes a first lens unit L1 having a positive refractive power (optical power=an inverse of the focal length), "L2" denotes a second lens unit L2 having a negative refractive power, "L3" denotes a third lens unit L3 having a positive refractive power, and "L4" denotes a fourth lens unit having a positive refractive power.

Furthermore, "SP" denotes an aperture stop, which is provided on the object side of the third lens unit L3. "G" denotes an optical block, such as an optical filter or a faceplate. "IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. If the zoom lens according to an exemplary embodiment of the present invention is used as a photographic optical system of a silver-halide film camera, the image plane IP is equivalent to a film surface of the optical system of the silver-halide film camera.

In a portion of each aberration chart (FIGS. 2A through 2C, 4A through 4C, 6A through 6C, 8A through 8C, and 10A through 10C) showing spherical aberration, "d-LINE" and "g-LINE" respectively denote d-line and g-line light. In a portion of each aberration chart (FIGS. 2A through 2C, 4A through 4C, 6A through 6C, 8A through 8C, and 10A through 10C) showing astigmatism, "$\Delta M$" and "$\Delta S$" respectively denote a meridional image plane and a sagittal image plane. "Fno" denotes an F-number. "$\omega$" denotes a half angle of view expressed by an actual trace value.

In each of the following exemplary embodiments, each of the wide-angle end and the telephoto end refers to a zooming position when a magnification-varying lens unit (the second lens unit L2) is positioned at each of the ends of a range in which the magnification varying lens unit can mechanically move along the optical axis.

Each of the first through the fifth exemplary embodiments is a four-unit zoom lens including, in order from the object side to the image side, the first lens unit L1 having a positive refractive power, the second lens unit L2 having a negative refractive power, the third lens unit L3 having a positive refractive power, and the fourth lens unit L4 having a positive refractive power. During zooming from the wide-angle end to the telephoto end, the second lens unit L2 moves towards the image side as indicated by an arrow in the corresponding drawing to execute variable magnification.

In addition, the zoom lens according to each exemplary embodiment moves the fourth lens unit L4 along a locus convex towards the object side to correct the variation on the image plane that may occur during variable magnification. By moving the fourth lens unit L4 along the locus convex towards the object side, each exemplary embodiment can effectively utilize the space existing between the third lens unit L3 and the fourth lens unit L4. Accordingly, each exemplary embodiment can effectively reduce the total length of the zoom lens system (optical system). Furthermore, the zoom lens according to each exemplary embodiment is a rear-focus type zoom lens, which executes focusing by moving the fourth lens unit L4 along the optical axis.

Each of a solid curve 4a and a dotted cure 4b for the fourth lens unit L4 illustrated in the drawing is a moving locus, along which the fourth lens unit L4 is moved to correct the variation on the image plane that may occur during zooming from the wide-angle end to the telephoto end when focusing on an infinitely-distant object or a short-distance object. For example, the zoom lens according to each exemplary embodiment executes focusing from an infinitely-distant object to a short-distance object at a zooming position at the telephoto end by moving the fourth lens unit L4 forward (towards the object side) as indicated by an arrow 4c.

In each of the first through the fifth exemplary embodiments, the first lens unit L1, the third lens unit L3, and the aperture stop SP are stationary for zooming and for focusing. However, alternatively, the first lens unit L1, the third lens unit L3, and the aperture stop SP can be moved to correct aberrations where necessary.

The zoom lens according to an exemplary embodiment of the present invention tolerates distortion that may occur at the wide-angle end to effectively achieve a wide angle of view and to effectively reduce the total size of the zoom lens system. As a type of a zoom lens that has tolerance against distortion, a conventional negative-lead type three-unit zoom lens has been used which includes, in order from the object side to the image side, a first lens unit having a negative refractive power, a second lens unit having a positive refractive power, and a third lens unit having a positive refractive power. However, if the above-described negative-lead type three-unit zoom lens is used and if the zoom ratio is increased, the F-number may considerably degrade. In particular, the F-number may become very great at the wide-angle end.

On the other hand, a conventional five-unit zoom lens has been utilized, which includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power. However, although the five-unit zoom lens like this may be useful in reducing the effective diameter of the front lens, the total length of the zoom lens system may become long in this case because a large number of lens units are used. Accordingly, the five-unit zoom lens like this is not useful as an optical system of a surveillance lens for use in a domical shaped surveillance zoom lens system because the total length of the surveillance zoom lens system is restricted.

In contrast, in the four-unit zoom lens according to an exemplary embodiment of the present invention, which includes the first lens unit having a positive refractive power, the second lens unit having a negative refractive power, the third lens unit having a positive refractive power, and the fourth lens unit having a positive refractive power, the level of degradation of the F-number Fno is smaller than that in the above-described two conventional zoom lens. In addition, if the four-unit zoom lens according to an exemplary embodiment of the present invention is used, it is easy to reduce the total length of the zoom lens system.

In the four-unit zoom lens, in correcting distortion, negative distortion occurring in the second lens unit L2 is corrected by the first lens unit L1. If distortion is permitted, the amount of distortion to be corrected can be reduced by decreasing the power of the first lens unit L1. However, in this case, the total size of the zoom lens system may become large because the amount of movement of the second lens unit L2 increases.

In order to prevent this, each exemplary embodiment utilizes the second lens unit L2, in which negative distortion has essentially occurred. In other words, each exemplary embodiment can achieve a wide angle of view by permitting a large amount of negative distortion by appropriately setting the shape of a lens included in the second lens unit L2.

In addition, the third lens unit L3 includes one positive lens and one negative lens to correct spherical aberration and axial chromatic aberration at the wide-angle end. Furthermore, each exemplary embodiment reduces the variation of aberration that may occur during focusing by reducing the diameter of an axial light flux that is incident to the fourth lens unit L4 by using the third lens unit L3, which is assigned with an intense positive refractive power.

In each exemplary embodiment, radiuses of curvature of surfaces of one negative lens of the second lens unit L2 on the object side and the image side (Rnf, Rnr) and radiuses of curvature of surfaces of one positive lens of the second lens unit L2 on the object side and the image side (Rpf, Rpr) satisfy the following conditions:

$$3.4 < (Rnf - Rnr)/(Rnf + Rnr) < 4.4 \quad (1)$$

$$-0.7 < (Rpf - Rpr)/(Rpf + Rpr) < -0.5 \quad (2).$$

Each of the conditions (1) and (2) provides a condition for reducing the total size of the zoom lens system while achieving a wide angle of view and a high zoom ratio at the same time. More specifically, the condition (1) provides a condition for the lens shape of the negative lens included in the second lens unit L2.

If the lower limit value of the condition (1) is exceeded, then the space among the lenses included in the second lens unit L2 can be decreased because the curvature of the lens surface can become less steep. Accordingly, it becomes easy to reduce the total size of the zoom lens system. However, in this case, it becomes difficult to correct spherical aberration at the telephoto end.

On the other hand, if the upper limit value of the condition (1) is exceeded, then the curvature of the lens surface becomes steep. Accordingly, a large space among the lenses included in the second lens unit L2 is required. Therefore, in this case, the total length of the zoom lens system and the effective diameter of the front lens may become large. In addition, in this case, although it becomes easier to achieve a wide angle of view by permitting distortion, it becomes difficult to correct curvature of field at the wide-angle end.

The condition (2) provides a condition for the lens shape of the positive lens included in the second lens unit L2. If the lower limit value of the condition (2) is exceeded, then it becomes easier to achieve a wide angle of view by permitting distortion because the curvature of the lens surface of the positive lens becomes less steep. However, it becomes difficult to correct coma at the wide-angle end.

On the other hand, if the upper limit value of the condition (2) is exceeded, then it becomes difficult to achieve a wide angle of view due to the increase of the effect of correcting distortion, which occurs due to the increase in the curvature of the lens surface of the positive lens. In addition, in this case, it becomes difficult to correct spherical aberration at the wide-angle end.

In order to achieve a wide angle of view in a zoom lens, two methods can be used in a large sense. More specifically, the focal length of the entire zoom lens system at the wide-angle end can be shortened or negative distortion can be permitted in this order.

If the former method is used, it is required to increase the refractive power of each lens unit to reduce the focal length of the entire zoom lens system. Therefore, in this case, the amount of variation on the image plane may increase. In addition, in this case, it is required to receive rays from a wide area. Accordingly, the effective diameter of the front lens may become large. On the other hand, the latter method is useful in correcting various aberrations other than distortion because the occurrence of distortion is permitted in this case.

With the above-described configuration, each exemplary embodiment of the present invention can achieve a wide angle of view of 65° or wider while achieving a small total size of the zoom lens system at the same time by appropriately setting the lens shape of each lens of the second lens unit L2. Accordingly, each exemplary embodiment having the above-described configuration can achieve a small-size zoom lens having a high optical performance.

It is yet further useful if the zoom lens according to each exemplary embodiment satisfies at least one of the following conditions. A focal length of the entire zoom lens system at the wide-angle end (fw), a focal length of and an Abbe number of a material of the positive lens included in the second lens unit L2 (f2p, νd2p), a radius of curvature of the lens surface of the lens included in the first lens unit L1 located closest to the image side (R1r), a radius of curvature of the lens surface of the lens included in the second lens unit L2 located closest to the object side (R2f), focal lengths of the first lens unit L1 and the third lens unit L3 (f1, f3), and a back focus at the wide-angle end (BFw) can satisfy at least one of the following conditions:

$$3.4 < f2p/fw < 4.2 \quad (3)$$

$$\nu d2p < 20 \quad (4)$$

$$-1.5 < (R1r - R2f)/(R1r + R2f) < 0.1 \quad (5)$$

$$5.5 < f1/fw < 7.5 \quad (6)$$

$$4.0 < f3/fw < 4.6 \quad (7)$$

$$2.2 < BFw/fw < 2.6 \quad (8).$$

The technical significance of each of the conditions (3) through (8) will be described in detail below. The condition (3) provides a condition for the power to be assigned to the positive lens included in the second lens unit L2. More specifically, the condition (3) provides a condition for effectively correcting curvature of field and chromatic aberration of magnification.

If the lower limit value of the condition (3) is exceeded, then the power of the positive lens increases. Accordingly, it becomes easier to correct chromatic aberration of magnification. However, because the ratio of variable magnification by the second lens unit L2 is increased, the power of the negative lens increases. Accordingly, the amount of the variation on the image plane that may occur during zooming may increase. In addition, the effect of correcting distortion by the positive lens may increase. Therefore, in this case, it becomes difficult to secure a wide angle of view.

On the other hand, if the upper limit value of the condition (3) is exceeded, the power of the positive lens decreases. Therefore, the effect of correcting distortion may decrease. Accordingly, it becomes easier to achieve a wide angle of view. However, in this case, it becomes difficult to correct chromatic aberration of magnification.

The condition (4) provides a condition for a glass material of the positive lens included in the second lens unit L2. More specifically, the condition (4) provides a condition for effectively correcting chromatic aberration of magnification. If the upper limit value of the condition (4) is exceeded, then chromatic aberration of magnification may become undercorrected by the second lens unit L2. Therefore, in this case, the optical performance may degrade.

The condition (5) provides a condition for the shape of an air lens formed between the first lens unit L1 and the second lens unit L2. More specifically, the condition (5) provides a condition for effectively correcting distortion.

If the lower limit value of the condition (5) is exceeded, then it is required that the surface of the front lens of the second lens unit L2 be highly concave from the object side. As a result, a large amount of negative distortion may occur. Accordingly, it becomes easier to achieve a wide angle of view. However, in this case, it is required to increase the space between the first lens unit L1 and the second lens unit L2 to prevent interference among the lenses. As a result, the effective diameter of the front lens may become large.

On the other hand, if the upper limit value of the condition (5) is exceeded, then it is required that the shape of the lens surface of the front lens of the second lens unit L2 be highly convex towards the object side. As a result, the amount of negative distortion may become small. Accordingly, it becomes difficult to achieve a wide angle of view.

The condition (6) provides a condition for appropriately setting the power assigned to the first lens unit L1. More specifically, the condition (6) provides a condition for effectively correcting spherical aberration and axial chromatic aberration at the telephoto end. If the lower limit value of the condition (6) is exceeded, then the power of the first lens unit L1 increases. As a result, it becomes difficult to correct spherical aberration at the telephoto end. In addition, it becomes difficult to correct axial chromatic aberration at the telephoto end.

On the other hand, if the upper limit value of the condition (6) is exceeded, then the power of the first lens unit L1 decreases. As a result, the amount of movement of the second lens unit L2 during zooming may increase. Accordingly, in this case, the total size of the zoom lens system may become large.

The condition (7) provides a condition for appropriately setting the power assigned to the third lens unit L3. More specifically, the condition (7) provides a condition for effectively correcting spherical aberration and axial chromatic aberration at the wide-angle end.

If the lower limit value of the condition (7) is exceeded, then the power of the third lens unit L3 increases. As a result, it becomes difficult to correct spherical aberration at the wide-angle end. In addition, in this case, it becomes difficult to achieve a long back focus. On the other hand, if the upper limit value of the condition (7) is exceeded, then the power of the third lens unit L3 decreases. As a result, it becomes difficult to correct axial chromatic aberration at the wide-angle end.

The condition (8) provides a condition for appropriately setting the back focus. If the lower limit value of the condition (8) is exceeded, then the back focus becomes short. As a result, it becomes difficult to provide a glass block, such as a filter, on the image side of the zoom lens system. In addition, in this case, the dimension of the exit pupil may become small. As a result, it becomes difficult to achieve a high telecentricity. Accordingly, the efficiency of light concentration on the surface of the image sensor may degrade. On the other hand, if the upper limit value of the condition (8) is exceeded, then the back focus may become too long to achieve a small size zoom lens system.

In order to effectively correcting aberration, it is further useful if the ranges of the values in the conditions (1) through (8) are altered as follows:

$$3.50 < (Rnf-Rnr)/(Rnf+Rnr) < 4.35 \quad (1a)$$

$$-0.69 < (Rpf-Rpr)/(Rpf+Rpr) < -0.51 \quad (2a)$$

$$3.4 < f2p/fw < 4.1 \quad (3a)$$

$$5 < \nu d2p < 20 \quad (4a)$$

$$-1.2 < (R1r-R2f)/(R1r+R2f) < 0.08 \quad (5a)$$

$$5.8 < f1/fw < 7.3 \quad (6a)$$

$$4.05 < f3/fw < 4.55 \quad (7a)$$

$$2.25 < BFw/fw < 2.55 \quad (8a).$$

In order to more effectively correcting aberration, it is yet further useful if the ranges of the values in the conditions (1a) through (8a) are altered as follows:

$$3.6 < (Rnf-Rnr)/(Rnf+Rnr) < 4.3 \quad (1b)$$

$$-0.68 < (Rpf-Rpr)/(Rpf+Rpr) < -0.52 \quad (2b)$$

$$3.45 < f2p/fw < 4.00 \quad (3b)$$

$$10 < \nu d2p < 19 \quad (4b)$$

$$-1.0 < (R1r-R2f)/(R1r+R2f) < 0.05 \quad (5b)$$

$$6.0 < f1/fw < 7.0 \quad (6b)$$

$$4.1 < f3/fw < 4.5 \quad (7b)$$

$$2.3 < BFw/fw < 2.5 \quad (8b).$$

With the above-described configuration, each exemplary embodiment of the present invention can achieve a high optical performance for the entire range of variable magnification and for the entire object distance in the zoom lens whose total size is small and with a simple lens configuration.

In the zoom lens according to each exemplary embodiment, distortion, among various aberrations, can be corrected by electric image processing. In particular, it is useful if the amount of distortion is small in a photographic optical system of an optical apparatus, such as a digital camera or a video camera. Accordingly, the effective diameter of the front lens can be easily reduced by correcting distortion by setting a smaller maximum imaging range (i.e., an effective image circle) at the wide-angle end than at the telephoto end.

With the above-described configuration, each exemplary embodiment of the present invention can achieve the zoom lens having a wide angle of view and high zoom ratio. In addition, each exemplary embodiment of the present invention having the above-described configuration can achieve a zoom lens whose total size is small and which has a high optical performance for the entire zooming range from the wide-angle end to the telephoto end and for the entire object distance from an infinitely-distant object to a short-distance object.

An exemplary lens configuration of each lens unit according to each numerical example will be described in detail below. The first lens unit L1 includes a cemented lens, which is constituted by a negative lens and a positive lens, and a positive lens having a meniscus shape, whose surface on the object side has a convex shape.

In the zoom lens according to each numerical example, the first lens unit L1 is assigned with a high positive refractive power to achieve a small-size zoom lens system. With this configuration, in the first lens unit L1, various aberrations, such as spherical aberration, may occur at the telephoto end in a great amount.

In order to prevent this, the zoom lens according to each numerical example reduces various aberrations that may otherwise occur in the first lens unit L1 by assigning the positive refractive power of the first lens unit L1 to the cemented lens and the positive lens to share the positive refractive power of the first lens unit L1 therewith.

In the second lens unit L2, the absolute value of the refractive power is higher on the image side than on the object side. More specifically, the second lens unit L2 includes a negative lens whose surface on the image side has a concave shape, a negative lens both of whose surfaces have a concave shape, and a positive lens whose surface on the object side has a convex shape.

In the zoom lens according to each numerical example, the second lens unit L2 is assigned with a high negative refractive power to achieve a wide angle of view at the wide-angle end while achieving a small effective diameter of the first lens unit L1 at the same time. Accordingly, in the second lens unit L2, various aberrations, such as curvature of field, may occur at the wide-angle end in a great amount.

In order to prevent this, in each exemplary embodiment, the two negative lenses of the second lens unit L2 share the negative refractive power of the second lens unit L2 assigned thereto. With this configuration, the zoom lens according to each exemplary embodiment can reduce the amount of curvature of field that may occur in the second lens unit L2 while permitting distortion. With the above-described lens configuration, the zoom lens according to each exemplary embodiment can achieve a high optical performance while achieving a wide angle of view and a front lens having a small effective diameter.

In addition, in the zoom lens according to each exemplary embodiment, a high-dispersion material, whose Abbe number is smaller than 20, is used as a material of the positive lens of the second lens unit L2. Accordingly, in the zoom lens according to each exemplary embodiment, the refractive power of the lens required for astigmatism can be restricted to be as low as possible. With the above-described configuration, the zoom lens according to each exemplary embodiment can achieve a small-size zoom lens system with a small number of constituent lenses.

The third lens unit L3 includes a positive lens whose surface on the object side has a convex shape and a negative lens whose surface on the image side has a concave shape. In the zoom lens according to each numerical example, the third lens unit L3 is assigned with a high positive refractive power to reduce the total length of the zoom lens system at the wide-angle end.

With this configuration, various aberrations, such as axial chromatic aberration, may occur in the third lens unit L3 in a great amount. In order to prevent this, in the zoom lens according to each numerical example, the third lens unit L3 includes the two lenses including the positive lens and the negative lens to execute achromatization.

The fourth lens unit L4 includes a cemented lens constituted by a positive lens and a negative lens. In each numerical example, the fourth lens unit L4 is constituted by as small a number of constituent lenses as possible. With this configuration, the zoom lens according to each numerical example can achieve a thin and light zoom lens system.

More specifically, in the zoom lens according to each numerical example, a low-dispersion material, whose Abbe number is high, is used as a material of the positive lens included in the fourth lens unit L4. With the above-described configuration, the zoom lens according to each numerical example can effectively reduce the amount of variation of chromatic aberration that may occur during zooming and focusing.

Numerical examples 1 through 5, which respectively correspond to the first through the fifth exemplary embodiments of the present invention, are set forth below. In each of the numerical examples 1 through 5, "i" (where i=1, 2, 3 . . . ) denotes the order of a surface from the object side to the image side, "ri" denotes a radius of curvature of an i-th optical surface (the i-th lens surface), "di" denotes an axial space between the i-th surface and the (i+1)-th surface, "ni" and "vi" respectively denote a refractive index and an Abbe number of the material of the i-th lens (optical member) with respect to d-line light.

In addition, "K" denotes a conic constant and "A3", "A4", "A5", "A6", "A7", "A8", "A9", and "A10" denote third-through tenth-order aspheric coefficients for each corresponding order, respectively. The aspheric shape is expressed as $$x = (h^2/R)/[1 + \{1 - (1+K)(h/R)^2\}^{1/2}] + A3 \cdot h^3 + A4 \cdot h^4 + A5 \cdot h^5 + A6 \cdot h^6 + A7 \cdot h^7 + A8 \cdot h^8 + A9 \cdot h^9 + A10 \cdot h^{10}$$

where "x" denotes a displacement from a surface vertex along the optical axis in a position at a height "h" from the optical axis, and "R" denotes a paraxial radius of curvature. The scientific notation "e-X" for each aspheric coefficient is equivalent to the exponential notation "×10$^{-X}$". In each numerical example, an asterisk "*", which is assigned to the right side of the surface number, denotes an aspheric surface.

The back focus BF is expressed by an air-equivalent distance from a last lens surface to a paraxial image plane. The lens total length is defined as a value calculated by adding the back focus (BF) to the distance from the lens front surface to the lens last surface. The length is expressed in the unit of millimeter. The relationship between each condition described above and each numerical example is set forth in Table 1.

NUMERICAL EXAMPLE 1

Surface Data

| Surface No. | r | d | nd | vd |
|---|---|---|---|---|
| 1 | 66.001 | 0.95 | 1.84666 | 23.9 |
| 2 | 18.685 | 4.70 | 1.63854 | 55.4 |
| 3 | −114.064 | 0.17 | | |
| 4 | 17.467 | 2.55 | 1.83481 | 42.7 |
| 5 | 57.960 | Variable | | |
| 6 | 56.260 | 0.55 | 1.88300 | 40.8 |
| 7 | 6.522 | 1.78 | | |
| 8 | −13.053 | 0.55 | 1.77250 | 49.6 |
| 9 | 7.582 | 0.86 | | |
| 10 | 9.936 | 1.28 | 1.94595 | 18.0 |
| 11 | 39.954 | Variable | | |
| 12 (Stop) | ∞ | 0.90 | | |
| 13* | 7.121 | 3.02 | 1.58313 | 59.4 |
| 14* | −61.804 | 0.13 | | |
| 15 | 7.812 | 0.55 | 1.84666 | 23.9 |
| 16 | 5.584 | Variable | | |
| 17* | 12.076 | 2.80 | 1.55332 | 71.7 |
| 18 | −6.753 | 0.50 | 1.84666 | 23.8 |
| 19 | −11.481 | Variable | | |
| 20 | ∞ | 1.86 | 1.51633 | 64.1 |
| 21 | ∞ | Variable | | |
| Image plane | ∞ | | | |

Aspheric Coefficients r13  K = −1.59514e+000  A3 = 2.75629e−004  A5 = 9.42978e−005
     A7 = −4.41243e−006  A9 = 6.41615e−008
r14  K = −9.62756e+001  A3 = −3.00943e−005  A5 = 3.69027e−005
     A7 = −3.82587e−006  A9 = 7.15431e−008
r17  K = 3.85078e−001  A4 = −2.60194e−004  A6 = 2.39315e−005
     A8 = −2.42220e−006  A10 = 9.16438e−008

Various Data
Zoom Ratio 11.57

| | Wide-angle end | Middle Focal Length | Telephoto end |
|---|---|---|---|
| Focal Length | 3.82 | 12.68 | 44.20 |
| F-number | 1.66 | 2.09 | 2.59 |
| Angle of View | 33.23 | 10.04 | 2.86 |
| Image Height | 2.25 | 2.25 | 2.25 |
| Lens Total Length | 52.92 | 52.92 | 52.92 |
| BF | 8.83 | 11.90 | 8.79 |
| d5 | 0.50 | 9.43 | 15.14 |
| d11 | 15.74 | 6.81 | 1.10 |
| d16 | 6.55 | 3.48 | 6.59 |
| d19 | 3.54 | 6.60 | 3.49 |
| d21 | 4.07 | 4.07 | 4.07 |

Various Data of Each Unit

| Lens unit | First surface | Focal length |
|---|---|---|
| 1 | 1 | 24.19 |
| 2 | 6 | −4.72 |
| 3 | 12 | 16.13 |
| 4 | 17 | 13.60 |
| 5 | 20 | ∞ |

NUMERICAL EXAMPLE 2

Surface Data

| Surface No. | r | d | nd | vd |
|---|---|---|---|---|
| 1 | 60.506 | 0.95 | 1.84666 | 23.9 |
| 2 | 18.017 | 4.80 | 1.63854 | 55.4 |
| 3 | −131.671 | 0.17 | | |
| 4 | 17.081 | 2.58 | 1.83481 | 42.7 |
| 5 | 55.002 | Variable | | |
| 6 | 217.822 | 0.55 | 1.88300 | 40.8 |
| 7 | 5.243 | 2.08 | | |
| 8 | −16.069 | 0.55 | 1.77250 | 49.6 |
| 9 | 9.946 | 0.69 | | |
| 10 | 10.564 | 1.18 | 2.10467 | 16.7 |
| 11 | 34.028 | Variable | | |
| 12 (Stop) | ∞ | 0.90 | | |
| 13* | 7.139 | 3.02 | 1.58313 | 59.4 |
| 14* | −45.493 | 0.13 | | |
| 15 | 7.847 | 0.55 | 1.84666 | 23.9 |
| 16 | 5.568 | Variable | | |
| 17* | 12.138 | 3.01 | 1.55332 | 71.7 |
| 18 | −6.185 | 0.50 | 1.84666 | 23.8 |
| 19 | −10.906 | Variable | | |
| 20 | ∞ | 1.86 | 1.51633 | 64.1 |
| 21 | ∞ | Variable | | |
| Image plane | ∞ | | | |

Aspheric Coefficients r13  K = −1.60960e+000   A3 = 2.86941e−004   A5 = 9.68112e−005
     A7 = −4.80627e−006   A9 = 7.83192e−008
r14  K = −1.05571e+002   A3 = −9.66093e−005  A5 = 2.71824e−005
     A7 = −3.52093e−006   A9 = 7.47196e−008
r17  K = 1.94660e+000    A4 = −3.58487e−004  A6 = 3.34266e−005
     A8 = −3.78002e−006   A10 = 1.51504e−007

Various Data
Zoom Ratio 11.83

| | Wide-angle end | Middle Focal Length | Telephoto end |
|---|---|---|---|
| Focal Length | 3.60 | 11.89 | 42.60 |
| F-number | 1.66 | 2.13 | 2.46 |
| Angle of View | 34.78 | 10.70 | 2.99 |
| Image Height | 2.25 | 2.25 | 2.25 |
| Lens Total Length | 53.20 | 53.20 | 53.20 |
| BF | 8.44 | 11.69 | 9.41 |
| d5 | 0.50 | 9.43 | 15.14 |
| d11 | 15.74 | 6.81 | 1.10 |
| d16 | 6.88 | 3.63 | 5.91 |
| d19 | 3.15 | 6.40 | 4.12 |
| d21 | 4.06 | 4.06 | 4.06 |

Various Data of Each Unit

| Lens unit | First surface | Focal length |
|---|---|---|
| 1 | 1 | 24.01 |
| 2 | 6 | −4.49 |
| 3 | 12 | 15.62 |
| 4 | 17 | 13.68 |
| 5 | 20 | ∞ |

NUMERICAL EXAMPLE 3

Surface Data

| Surface No. | r | d | nd | vd |
|---|---|---|---|---|
| 1 | 64.618 | 0.95 | 1.84666 | 23.9 |
| 2 | 18.650 | 4.70 | 1.63854 | 55.4 |
| 3 | −116.689 | 0.17 | | |
| 4 | 17.405 | 2.55 | 1.83481 | 42.7 |
| 5 | 57.484 | Variable | | |
| 6 | 122.438 | 0.55 | 1.88300 | 40.8 |
| 7 | 6.210 | 1.91 | | |
| 8 | −14.456 | 0.55 | 1.77250 | 49.6 |
| 9 | 8.260 | 0.81 | | |
| 10 | 10.327 | 1.56 | 1.94595 | 18.0 |
| 11 | 52.160 | Variable | | |
| 12 (Stop) | ∞ | 0.90 | | |
| 13* | 7.140 | 2.99 | 1.58313 | 59.4 |
| 14* | −62.269 | 0.13 | | |
| 15 | 7.847 | 0.55 | 1.84666 | 23.9 |
| 16 | 5.600 | Variable | | |
| 17* | 12.179 | 2.93 | 1.55332 | 71.7 |
| 18 | −6.735 | 0.50 | 1.84666 | 23.8 |
| 19 | −11.586 | Variable | | |
| 20 | ∞ | 1.86 | 1.51633 | 64.1 |
| 21 | ∞ | Variable | | |
| Image plane | ∞ | | | |

Aspheric Coefficients r13  K = −1.59521e+000   A3 = 2.90600e−004   A5 = 9.54730e−005
     A7 = −4.48927e−006   A9 = 6.51546e−008
r14  K = −9.60700e+001   A3 = −7.17152e−006  A5 = 3.72875e−005
     A7 = −3.93169e−006   A9 = 7.41615e−008
r17  K = 1.47662e−001    A4 = −2.27188e−004  A6 = 2.28843e−005
     A8 = −2.26984e−006   A10 = 8.48915e−008

Various Data
Zoom Ratio 11.59

| | Wide-angle end | Middle Focal Length | Telephoto end |
|---|---|---|---|
| Focal Length | 3.82 | 12.58 | 44.24 |
| F-number | 1.66 | 2.09 | 2.64 |
| Angle of View | 33.25 | 10.12 | 2.86 |
| Image Height | 2.25 | 2.25 | 2.25 |
| Lens Total Length | 53.51 | 53.51 | 53.51 |
| BF | 8.85 | 11.89 | 8.72 |
| d5 | 0.50 | 9.43 | 15.14 |
| d11 | 15.74 | 6.81 | 1.10 |
| d16 | 6.68 | 3.63 | 6.80 |
| d19 | 3.56 | 6.61 | 3.44 |
| d21 | 4.06 | 4.06 | 4.06 |

Various Data of Each Unit

| Lens unit | First surface | Focal length |
|---|---|---|
| 1 | 1 | 24.09 |
| 2 | 6 | −4.73 |
| 3 | 12 | 16.24 |
| 4 | 17 | 13.83 |
| 5 | 20 | ∞ |

NUMERICAL EXAMPLE 4

Surface Data

| Surface No. | r | d | nd | vd |
|---|---|---|---|---|
| 1 | 59.879 | 0.95 | 1.84666 | 23.9 |
| 2 | 18.152 | 4.77 | 1.63854 | 55.4 |
| 3 | −131.017 | 0.17 | | |
| 4 | 17.236 | 2.57 | 1.83481 | 42.7 |
| 5 | 56.402 | Variable | | |
| 6 | 200.730 | 0.55 | 1.88300 | 40.8 |
| 7 | 5.604 | 2.03 | | |
| 8 | −16.480 | 0.55 | 1.80400 | 46.6 |
| 9 | 9.329 | 0.82 | | |
| 10 | 10.868 | 1.16 | 2.10467 | 16.7 |
| 11 | 35.008 | Variable | | |
| 12 (Stop) | ∞ | 0.90 | | |
| 13* | 7.122 | 2.99 | 1.58313 | 59.4 |
| 14* | −53.886 | 0.13 | | |
| 15 | 7.963 | 0.55 | 1.84666 | 23.9 |
| 16 | 5.619 | Variable | | |
| 17* | 12.135 | 3.31 | 1.55332 | 71.7 |
| 18 | −6.365 | 0.50 | 1.84666 | 23.8 |
| 19 | −10.827 | Variable | | |
| 20 | ∞ | 1.86 | 1.51633 | 64.1 |
| 21 | ∞ | Variable | | |
| Image plane | ∞ | | | |

Aspheric Coefficients r13 K = −1.65630e+000   A3 = 3.01286e−004   A5 = 9.37755e−005
    A7 = −4.68275e−006  A9 = 7.33688e−008
r14 K = −1.27666e+002   A3 = −7.84933e−005  A5 = 1.84564e−005
    A7 = −3.20728e−006  A9 = 6.74175e−008
r17 K = 2.37090e+000    A4 = −4.25885e−004  A6 = 3.03188e−005
    A8 = −3.52640e−006  A10 = 1.38179e−007

Various Data
Zoom Ratio 12.16

| | Wide-angle end | Middle Focal Length | Telephoto end |
|---|---|---|---|
| Focal Length | 3.60 | 12.00 | 43.73 |
| F-number | 1.66 | 2.11 | 2.50 |
| Angle of View | 34.83 | 10.59 | 2.90 |
| Image Height | 2.25 | 2.25 | 2.25 |
| Lens Total Length | 53.47 | 53.47 | 53.47 |
| BF | 8.54 | 11.70 | 9.05 |
| d5 | 0.50 | 9.43 | 15.14 |
| d11 | 15.74 | 6.81 | 1.10 |
| d16 | 6.75 | 3.59 | 6.24 |
| d19 | 3.25 | 6.41 | 3.76 |
| d21 | 4.06 | 4.06 | 4.06 |

Various Data of Each Unit

| Lens unit | First surface | Focal length |
|---|---|---|
| 1 | 1 | 23.94 |
| 2 | 6 | −4.49 |
| 3 | 12 | 16.10 |
| 4 | 17 | 13.42 |
| 5 | 20 | ∞ |

NUMERICAL EXAMPLE 5

Surface Data

| Surface No. | r | d | nd | vd |
|---|---|---|---|---|
| 1 | 43.129 | 0.95 | 1.84666 | 23.9 |
| 2 | 17.561 | 4.52 | 1.60311 | 60.6 |
| 3 | −1112.865 | 0.17 | | |
| 4 | 18.476 | 2.77 | 1.83481 | 42.7 |
| 5 | 71.073 | Variable | | |
| 6 | 84.205 | 0.55 | 1.88300 | 40.8 |
| 7 | 6.143 | 1.97 | | |
| 8 | −13.429 | 0.55 | 1.80400 | 46.6 |
| 9 | 8.273 | 0.83 | | |
| 10 | 10.689 | 1.17 | 2.14352 | 17.8 |
| 11 | 34.396 | Variable | | |
| 12 (Stop) | ∞ | 0.90 | | |
| 13* | 7.357 | 2.94 | 1.58313 | 59.4 |
| 14* | −62.985 | 0.13 | | |
| 15 | 7.915 | 0.55 | 1.84666 | 23.9 |
| 16 | 5.743 | Variable | | |
| 17* | 12.872 | 2.84 | 1.55332 | 71.7 |
| 18 | −6.735 | 0.50 | 1.84666 | 23.8 |
| 19 | −11.712 | Variable | | |
| 20 | ∞ | 1.86 | 1.51633 | 64.1 |
| 21 | ∞ | Variable | | |
| Image plane | ∞ | | | |

Aspheric Coefficients r13 K = −1.80040e+000   A3 = 3.13957e−004   A5 = 1.00850e−004
    A7 = −3.74248e−006  A9 = 4.73495e−008
r14 K = −3.19258e+001   A3 = −3.73458e−005  A5 = 4.79503e−005
    A7 = −3.14180e−006  A9 = 4.89477e−008
r17 K = 2.49680e+000    A4 = −3.45720e−004  A6 = 1.99827e−005
    A8 = −2.02421e−006  A10 = 6.96083e−008

Various Data
Zoom Ratio 14.57

| | Wide-angle end | Middle Focal Length | Telephoto end |
|---|---|---|---|
| Focal Length | 3.77 | 13.29 | 54.95 |
| F-number | 1.66 | 2.14 | 2.95 |
| Angle of View | 33.58 | 9.63 | 2.31 |
| Image Height | 2.25 | 2.25 | 2.25 |
| Lens Total Length | 55.57 | 55.57 | 55.57 |
| BF | 9.14 | 12.85 | 8.36 |
| d5 | 0.50 | 10.04 | 16.14 |
| d11 | 16.74 | 7.20 | 1.10 |
| d16 | 7.86 | 4.14 | 8.63 |
| d19 | 3.85 | 7.56 | 3.07 |
| d21 | 4.06 | 4.06 | 4.06 |

Various Data of Each Unit

| Lens unit | First surface | Focal length |
|---|---|---|
| 1 | 1 | 25.11 |
| 2 | 6 | −4.51 |
| 3 | 12 | 16.42 |
| 4 | 17 | 14.41 |
| 5 | 20 | ∞ |

TABLE 1

| Condition | Numerical Example | | | | |
|---|---|---|---|---|---|
| | 1 | 2 | 3 | 4 | 5 |
| (1) | 3.77 | 4.25 | 3.67 | 3.61 | 4.21 |
| (2) | −0.60 | −0.53 | −0.67 | −0.53 | −0.53 |
| (3) | 3.59 | 3.75 | 3.50 | 3.87 | 3.50 |
| (4) | 18.0 | 16.7 | 18.0 | 16.7 | 17.8 |
| (5) | 0.01 | −0.60 | −0.36 | −0.56 | −0.08 |
| (6) | 6.33 | 6.67 | 6.31 | 6.65 | 6.66 |
| (7) | 4.22 | 4.34 | 4.25 | 4.47 | 4.36 |
| (8) | 2.31 | 2.34 | 2.32 | 2.37 | 2.42 |

An exemplary embodiment of a video camera (optical apparatus) that uses the zoom lens according to each exemplary embodiment of the present invention as a photographic optical system thereof will be described below with reference to FIG. 11.

Referring to FIG. 11, the video camera includes a camera body 10 and a photographic optical system 11. The photographic optical system 11 includes an optical system according to any of the first through the fifth exemplary embodiments described above.

The camera body 10 includes a solid-state image sensor (photoelectrical conversion element) 12, such as a CCD sensor or a MO sensor, configured to optically receive an object image formed by the photographic optical system 11.

The camera body 10 also includes a recording unit 13, which is configured to record information corresponding to an object image that has been received and photoelectrically converted by the solid-state image sensor 12. In addition, the camera body 10 also includes a viewfinder 14, via which a user of the video camera can observe an object image displayed on a display device (not illustrated). The display device includes a liquid crystal display (LCD) panel and displays the object image formed on the image sensor 12.

By applying the zoom lens according to each exemplary embodiment of the present invention to an optical apparatus, such as a video camera, the present invention can implement a small-size optical apparatus having a high optical performance.

In accordance with at least one of the foregoing amendments, the present invention is directed to a zoom lens whose total size is small and has a wide angle of view and a high optical performance for the entire zoom area, and to an optical apparatus on which the zoom lens can be used. However, although the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095809 filed Apr. 19, 2010, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein the second lens unit and the fourth lens unit move during zooming,
wherein the third lens unit includes at least one positive lens and at least one negative lens, and
wherein, when Rnf and Rnr are radiuses of curvature of surfaces on the object side and the image side respectively of one negative lens of the second lens unit, Rpf and Rpr are radiuses of curvature of surfaces on the object side and the image side respectively of one positive lens of the second lens unit, the following conditions are satisfied:

$3.4 < (Rnf-Rnr)/(Rnf+Rnr) < 4.4$ $-0.7 < (Rpf-Rpr)/(Rpf+Rpr) < -0.5$.

2. The zoom lens according to claim 1, wherein, when fw is a focal length of the entire zoom lens at a wide-angle end, and vd2p is an Abbe number of a material of the positive lens included in the second lens unit and f2p is a focal length of the positive lens included in the second lens unit,
the following conditions are satisfied:

$3.4 < f2p/fw < 4.2$ $vd2p < 20$.

3. The zoom lens according to claim 1, wherein,
when R1r is a radius of curvature of a surface of a lens included in the first lens unit located closest to the image side, and R2f is a radius of curvature of a surface of a lens included in the second lens unit located closest to the object side,
the following condition is satisfied:

$-1.5 < (R1r-R2f)/(R1r+R2f) < 0.1$.

4. The zoom lens according to claim 1, wherein,
when f1 is a focal length of the first lens unit, and fw is a focal length of the entire zoom lens at a wide-angle end,
the following condition is satisfied:

$5.5 < f1/fw < 7.5$.

5. The zoom lens according to claim 1, wherein,
when f3 is a focal length of the third lens unit, and fw is a focal length of the entire zoom lens at a wide-angle end,
the following condition is satisfied:

$4.0 < f3/fw < 4.6$.

6. The zoom lens according to claim 1, wherein,
when BFw is a back focus at a wide-angle end, and fw is a focal length of the entire zoom lens at the wide-angle end,
the following condition is satisfied:

$2.2 < BFw/fw < 2.6$.

7. An optical apparatus comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power,
wherein the second lens unit and the fourth lens unit move during zooming,
wherein the third lens unit includes at least one positive lens and at least one negative lens, and
wherein, when Rnf and Rnr are radiuses of curvature of surfaces on the object side and the image side respectively of one negative lens of the second lens unit, Rpf and Rpr are radiuses of curvature of surfaces on the object side and the image side respectively of one positive lens of the second lens unit, the following conditions are satisfied:

$$3.4 < (Rnf-Rnr)/(Rnf+Rnr) < 4.4$$

$$-0.7 < (Rpf-Rpr)/(Rpf+Rpr) < -0.5.$$

8. The optical apparatus according to claim 7, wherein a diameter of an effective image circle at a wide-angle end is smaller than a diameter of an effective image circle at a telephoto end.

* * * * *